United States Patent
Shin et al.

(10) Patent No.: US 7,707,422 B2
(45) Date of Patent: Apr. 27, 2010

(54) METHOD FOR EMBEDDING WATERMARK INTO AN IMAGE AND DIGITAL VIDEO RECORDER USING SAID METHOD

(75) Inventors: Dong-Hwan Shin, Seoul (KR); Kyong-Soon Kim, Kyunggi-do (KR); Won-Ha Lee, Seoul (KR); Jong-Uk Choi, Seoul (KR)

(73) Assignees: Marktek Inc., Seoul (KR); Markany Inc., Seoul (KR)

( * ) Notice: Subject to any disclaimer, the term of this patent is extended or adjusted under 35 U.S.C. 154(b) by 940 days.

(21) Appl. No.: 10/830,633

(22) Filed: Apr. 22, 2004

(65) Prior Publication Data

US 2004/0258243 A1    Dec. 23, 2004

(30) Foreign Application Priority Data

Apr. 25, 2003   (KR) .................. 10-2003-0026248

(51) Int. Cl.
   *H04L 9/32*   (2006.01)
(52) U.S. Cl. ....................................... 713/176
(58) Field of Classification Search .................. 713/176
   See application file for complete search history.

(56) References Cited

U.S. PATENT DOCUMENTS 6,064,764 A * 5/2000 Bhaskaran et al. .......... 382/183
2004/0257977 A1* 12/2004 Van Der Veen et al. ..... 370/207
2005/0147248 A1* 7/2005 Lemma et al. .............. 380/203

FOREIGN PATENT DOCUMENTS

KR        2001-62934        3/2002

OTHER PUBLICATIONS

Zhang, et al., "Enhancements of Angiograms via M-band wavelet transform," Biomedical Photonics and Optoelectronic Imaging, vol. 4224, pp. 165-169 (2000).

* cited by examiner

*Primary Examiner*—Benjamin E Lanier
*Assistant Examiner*—Cordelia Kane
(74) *Attorney, Agent, or Firm*—Blakely, Sokoloff, Taylor & Zafman LLP

(57) ABSTRACT

The present invention relates to a method for embedding and detecting a watermark where a forgery/alternation of an image can be identified and the location of forgery/alternation can be verified by embedding and detecting a watermark into a digital image which is shot in real time. The watermark is generated by using a quantized coefficient after frequency transform used in the compression process. By embedding this into an image, the image can be compressed simultaneously with the embedded watermark. The present invention relates to a method for embedding a robust watermark which embeds a random sequence circular shifted from an original pseudo random sequence by the distance d as the watermark is embedded into an image, and a method for generating and embedding the watermark by using a DCT coefficient quantized during an MPEG compression process of the image.

3 Claims, 26 Drawing Sheets

Original Sequence

Shifted Sequence (a) ORIGINAL IMAGE    (b) WATERMARKED IMAGE

METHOD FOR EMBEDDING WATERMARK INTO AN IMAGE AND DIGITAL VIDEO RECORDER USING SAID METHOD

CROSS-REFERENCE TO RELATED APPLICATIONS

The present patent application claims priority from Korean Patent Application No. 2003-0026248, filed on Apr. 25, 2003.

BACKGROUND OF THE INVENTION

1. Field of the Invention

The present invention relates to a method for embedding watermark into an image and digital video recorder using said method, and more particularly a method for embedding watermark wherein forgery/alternation of image can be identified and the location of forgery/alternation can be verified by embedding watermark into a digital image in real time. Also, said embedment of watermark can be performed simultaneously with compression.

2. Description of the Related Art

The present invention relates to Korean Patent Application No. 2001-62934 entitled, "NETWORK CAMERA FOR PREVENTING FORGERY OF DIGITAL IMAGE, NETWORK CAMERA SERVER AND DIGITAL VIDEO STORAGE SYSTEM AND METHOD FOR AUTHENTICATING DIGITAL IMAGE OUTPUT THEREFROM" filed by the same applicant of the present application, which is included as a reference material of the present invention.

The above-identified application discloses a method for preventing forgery/alternation of images by embedding robust watermark (RW) and/or fragile watermark (FW) into an image signal in real time, and a network camera, network camera server, and digital video storage device applying said method. In particular, in said application, the digital image signal is compressed separately after embedding RW but before embedding RW.

The present invention is an invention improving the method for embedding robust watermark and fragile watermark of the above application. In particular, the present invention discloses a method for embedding RW and/or FW simultaneously with performing compression, a method for increasing the amount of information being embedded, a method for enhancing the embedment rate to be close to real time, a method for embedding watermark which has interoperability when embedding and detecting watermark at the spatial domain and transformation domain, etc. Also, the present invention discloses a digital video recorder (DVR) applying said method for embedding robust watermark and/or fragile watermark.

Before describing the present invention, the digital video recorder applying the method of the present invention will be described in the following.

The DVR (Digital Video Recorder) as the digital CCTV system is widely being used as a monitoring system of the next generation which will replace monitoring systems of the conventional CCD camera, VCR, TAPE, etc. The analogue monitoring system monitors the environment to be monitored, records the necessary image data on a tape, and searches and stores said tape. However, the DVR can transform image data which was shot into digital signals and store them at a hard disc or DVD-RANM, etc. Thus, it appears that the DVR has a number of advantages over the analogue system. Also, one DVR can record and thus control a number of cameras (for example, 16 cameras) and a number of images (16 cut images).

Meanwhile, the method for embedding and extracting watermark of the present invention mainly uses the characteristics of a frequency transform. Transform which can be used in this regard includes wavelet transform (WT) and discrete cosine transform (DCT), and such transforms are mainly used in removing the redundancy of the spatial information of an image at compressed algorithms.

First, wavelet transform is a transformation method advantageous in extracting the characteristics of a signal by reducing sampling intervals where the signal changes extremely, and by increasing intervals where the signal changes slowly. Such is disclosed in "Enhancement of Angiograms via M-Band Wavelet Transform" Proceedings of SPIE Biomedical Photonics and Optoelectronic Imaging, 165-169, 2000 written by Yang Yan and Zhang Dong.

Together with Fourier transform, wavelet transform is a method for managing signals which has been actively studied in the 1990s. According to wavelet transform, signals are analyzed by reducing the window size on the time axis for signals with high frequency and increasing the window size on the time axis for signals with low frequency. Therefore, not only information on frequency but also information on time for each band can be known by using the wavelet transform. Also, it is possible to deal with only the signal of a desired band because signals can be divided into bands.

DCT transform is a transformation method transforming data at a two-dimensional area into a two-dimensional frequency plane. The two-dimensional signal obtained as a result of the DCT transform remains the same size and is only expressed in real numbers. Also, since most image signals are concentrated at the low frequency domain, most coefficients which are not 0 are located at the low frequency band, and the coefficients of high frequency elements mostly have a value of 0 or smaller. Therefore, by taking only the meaningful coefficients of the low frequency band and IDCT transforming them, image signals having high frequency elements removed from their image can be obtained. Accordingly, the compression efficiency can be remarkably increased by performing compression using low frequency band coefficients after DCT transforming them, than when performing compression using the coefficient of each pixel of the spatial domain.

SUMMARY OF THE INVENTION

It is an object of the present invention to provide a system enabling authentication of image which is shot in real time and prevention forgery/alternation.

It is another object of the present invention to provide a method for embedding robust watermark and/or fragile watermark simultaneously with performing compression.

It is still another object of the present invention to provide a method for increasing the amount of information being embedded as watermark and enhancing the embedment rate of the watermark to be close to real time.

It is still another object of the present invention to provide a method for embedding watermark which has interoperability when embedding and detecting watermark at the spatial domain and transformation domain, etc.

It is still another object of the present invention to provide a digital video recorder (DVR) applying the method for embedding robust watermark and/or fragile watermark as above.

In order to attain the above objects, the present invention provides a method for embedding watermark into an image comprising: embedding a random sequence circular-shifted from an original pseudo random sequence by the distance d as watermark into an image.

In order to attain another object of the present invention, the present invention provides a method for embedding watermark into an image, comprising: generating a pseudo random sequence; generating a watermark sequence by circular-shifting said pseudo random sequence by the distance d; multiplying said watermark sequence by a coefficient representing watermark embedding strength; generating a watermark-embedded image in a frequency transformation domain by adding the multiplied watermark sequence to a wavelet-transformed original image; and generating a watermark-embedded image in a spatial domain by inverse wavelet-transforming said watermark-embedded image.

Also, the present invention provides a method for embedding watermark into an image, comprising: generating a pseudo random sequence; generating a watermark sequence by circular-shifting said pseudo random sequence by the distance d; inverse wavelet-transforming said watermark sequence; multiplying said inverse wavelet-transformed watermark sequence by coefficient representing watermark embedding strength; and generating a watermark-embedded image by adding said multiplied watermark sequence to an original image in spatial domain.

Also, the present invention provides a method for embedding watermark into an image, comprising: generating a pseudo random sequence; generating a watermark sequence by circular-shifting said pseudo random sequence by the distance d; discrete cosine transforming an original image; replacing LSB of DC coefficients or AC coefficients among the discrete cosine transformed coefficients with said watermark sequence; and inverse discrete cosine transforming the image of which said LSB is replaced.

Also, the present invention provides a method for embedding watermark into an image, comprising: generating a pseudo random sequence; generating a watermark sequence by circular-shifting said pseudo random sequence by the distance d; inverse discrete cosine transforming said watermark sequence; and adding said discrete cosine transformed watermark sequence to an original image.

In order to attain still another object of the present invention, the present invention provides a method for embedding watermark into an image simultaneously with MPEG compression for the image, comprising: discrete cosine transforming an input image; quantizing said discrete cosine transformed image; configuring watermark using the quantized DCT coefficient; embedding said watermark into said image; and variable length coding the watermark-embedded image.

Also, the present invention provides a method for embedding watermark into an image simultaneously with MPEG compression for the image, comprising: inputting quantized DCT coefficient of a corresponding macro block in said image; dividing each DCT block of said corresponding macro block into a signature extracting region and a watermark embedding region; combining said quantized DCT coefficient in said signature extracting region with user information; obtaining a hash value by regarding said combined value as an input value of the hash function; and embedding said hash value into LSB of the quantized DCT coefficient in said watermark embedding region.

Also, the present invention provides a method for embedding watermark into an image simultaneously with MPEG compression for image, comprising: inputting quantized DCT coefficients of all macro blocks in corresponding slice in said image; dividing each DCT block of said macro blocks into the signature extracting region and the watermark embedding region; combining said quantized DCT coefficients in said signature extracting region with user information; obtaining hash value by regarding said combined value as an input value of hash function; and embedding said hash value into LSB of quantized DCT coefficient in watermark embedding region in next slice of said corresponding slice.

Also, the present invention provides a method for embedding watermark into an image simultaneously with JPEG compression for image, comprising: discrete cosine transforming an input image; quantizing said discrete-cosine transformed image; configuring watermark using the quantized DCT coefficient; embedding said watermark into said image; and entropy coding the watermark-embedded image.

In order to attain still another object of the present invention, the present invention provides a method for embedding watermark into an image simultaneously with wavelet compression for image, comprising: dividing quantized wavelet coefficients of wavelet compression process into a signature extracting region and a watermark embedding region; combining said quantized wavelet coefficient in said signature extracting region with user information; obtaining a hash value regarding said combined value as an input value of a hash function; and making LSB in said watermark embedding region 0, and embedding said hash value bit therein.

Further, the present invention provides a digital video recorder for embedding watermark into an image which is shot in real time in accordance with the method for embedding watermark as described above.

DESCRIPTION OF THE PREFERRED EMBODIMENT

Preferred embodiments of the present invention will be described in detail with reference to the accompanying drawings in the following.

Figure 1:
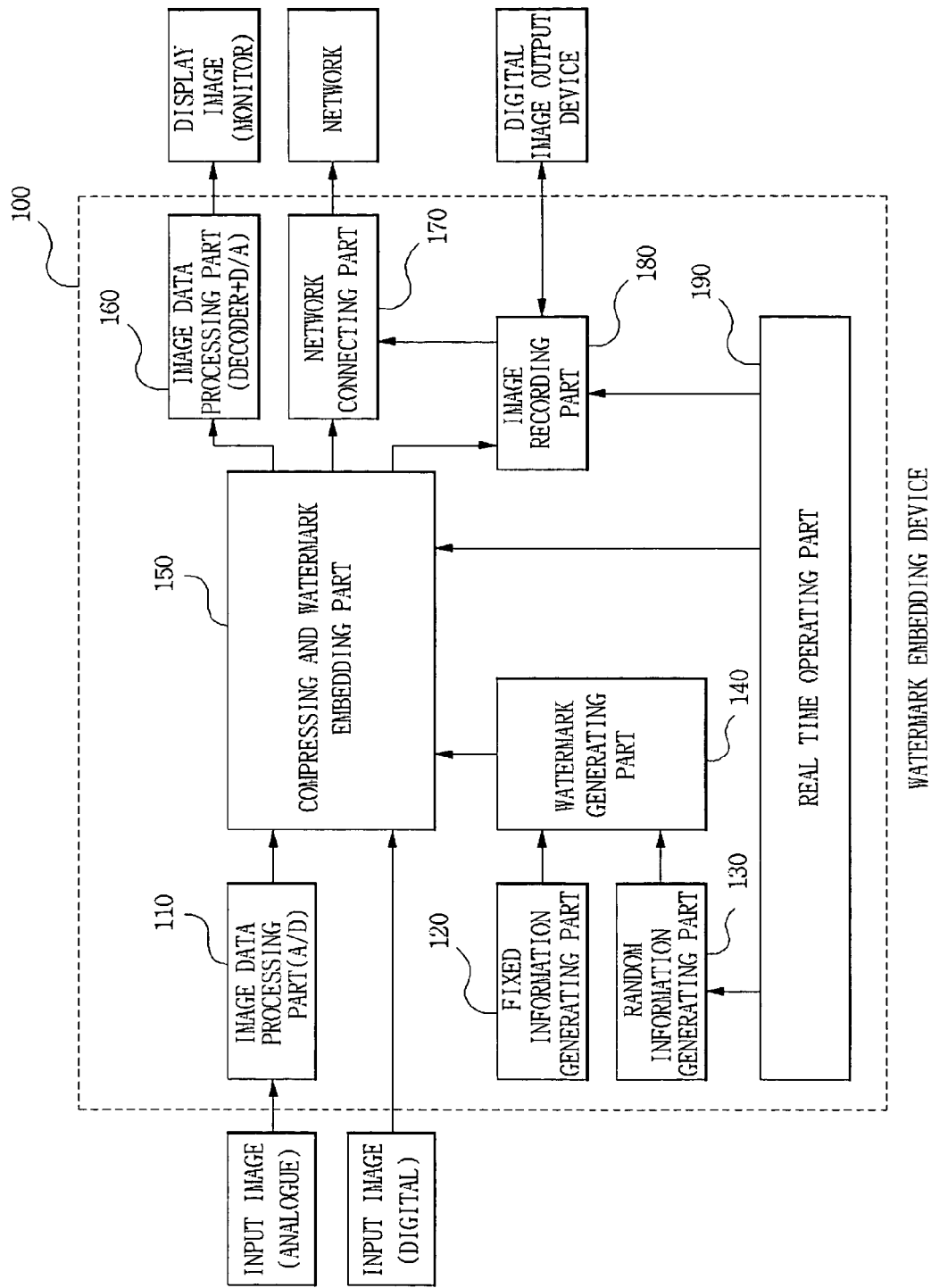
FIG. 1 is a block diagram showing the constitution of the system applying the method for embedding watermark of the present invention.

FIG. 1 is a block diagram showing the constitution of the system applying the method for embedding watermark of the present invention. The system of FIG. 1 may be a network camera, camera server, etc. applying the constitution of compressing an image signal which is shot and embedding watermark. In particular, it may be a digital video recorder.

Referring to FIG. 1, the watermark embedding device (100) of the present invention comprises image data processing part (A/D) (110), fixed information generating part (120), random information generating part (130), watermark generating part (140), compressing and watermark embedding part (150), image data processing part (decoder+D/A) (160), network connecting part (170), and image recording part (180).

The image data processing part (A/D) (110) is a constitutional element required when the image signal which is shot and inputted is analogue. It transforms analogue image signals into digital image signals (A/D: Analogue to Digital) The fixed information generating part (120) is where the unique numbers of the image recorder and the camera information of the input image are created, and the random information generating part (130) is where the recording time of the image and the information to be randomly recorded by the user are created.

The watermark generating part (140) is where the watermark to be embedded into digital image is generated by using the information generated at said fixed information generating part (120) and random information generating part (130).

The compressing and watermark embedding part (150) is where the inputted digital image is compressed and watermark is embedded. This will be described in more detail referring to FIG. 3 in the following.

Real time operating part (190) is where the function of the constitutional elements of the system of FIG. 1 is controlled so that it can be performed in real time.

The compressed image signal embedded with the watermark outputted to the compressing and watermark embedding part (150) can be inputted into the image data processing part (decoder+D/A) (160), network connecting part (170), or image recording part (180: digital recorders such as hard disc, DVD-RAM, CD-RW magnetic tape, etc.).

The image data processing part (decoder+D/A) (160) decompresses the compressed image and simultaneously transforms the decompressed digital image into an analogue image. The image transformed into analogue can be seen by general users through image displays such as monitor, etc.

The network connecting part (170) is where data is transmitted to the network so that the compressed digital image can be recorded and observed from distant areas.

The image recording part (180) is where the compressed digital image is recorded and stored. The digital image recorded at the image recording part (180) can be outputted outside by a digital image output device. The digital image output device may be a device such as floppy diskette, universal serial bus (USB), CD, etc.

Figure 2:
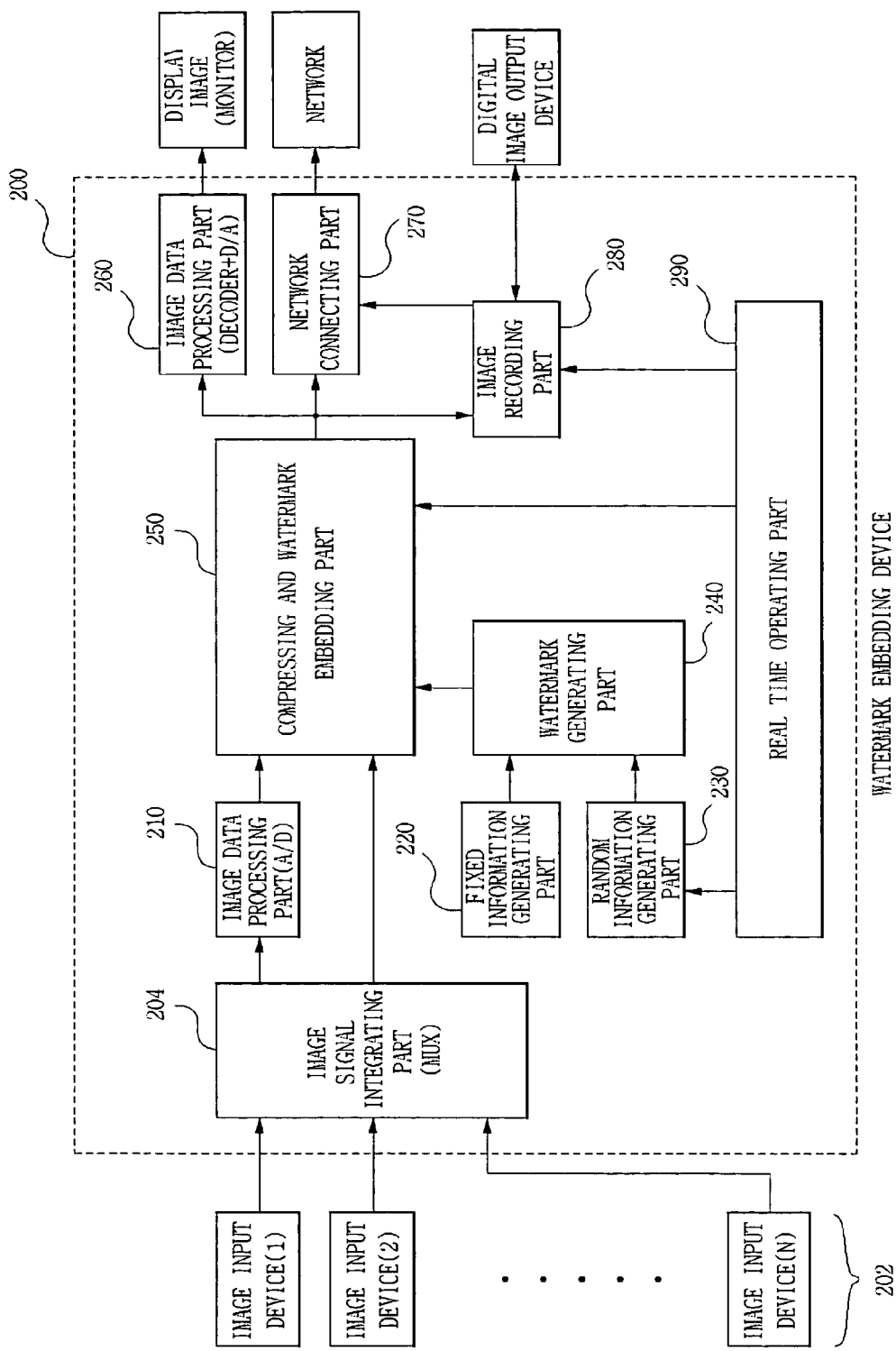
FIG. 2 is a block diagram showing the constitution of the system applying the method for embedding watermark of the present invention wherein images from a plurality of image input devices are received at a watermark embedding device.

FIG. 2 is a block diagram showing the constitution of the system applying the method for embedding watermark of the present invention which differs from the system of FIG. 1 in that the images are received from a plurality of image input device into a watermark embedding device. In particular, the system of FIG. 2 can be an example wherein the method for embedding watermark of the present invention is applied to a digital video recorder (DVR). The DVRs currently being used receives inputs from usually 4~16 channels cameras and record each of them as separate files.

Since the general constitutional elements of the system of FIG. 2 and its function are the same as those of the system of FIG. 1, they will not be described in detail in the following.

However, image signals are inputted from a plurality of image input devices (202), and the inputted image signals are integrated by the time division method at the image signal integrating part (204) and inputted into the image data processing part (210).

Figure 3A:
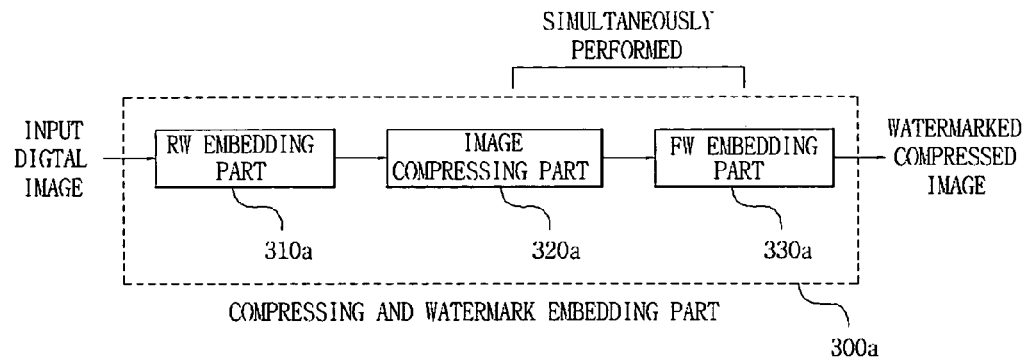
FIG. 3*a* is a drawing showing the constitution of embedding watermark before compressing the digital image.
Figure 3B:
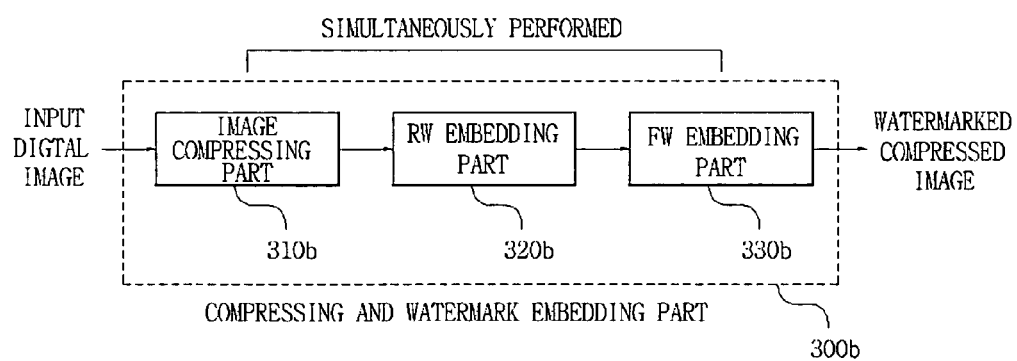
FIG. 3*b* is a drawing showing the constitution of embedding watermark simultaneously with compressing the digital image.
Figure 4:
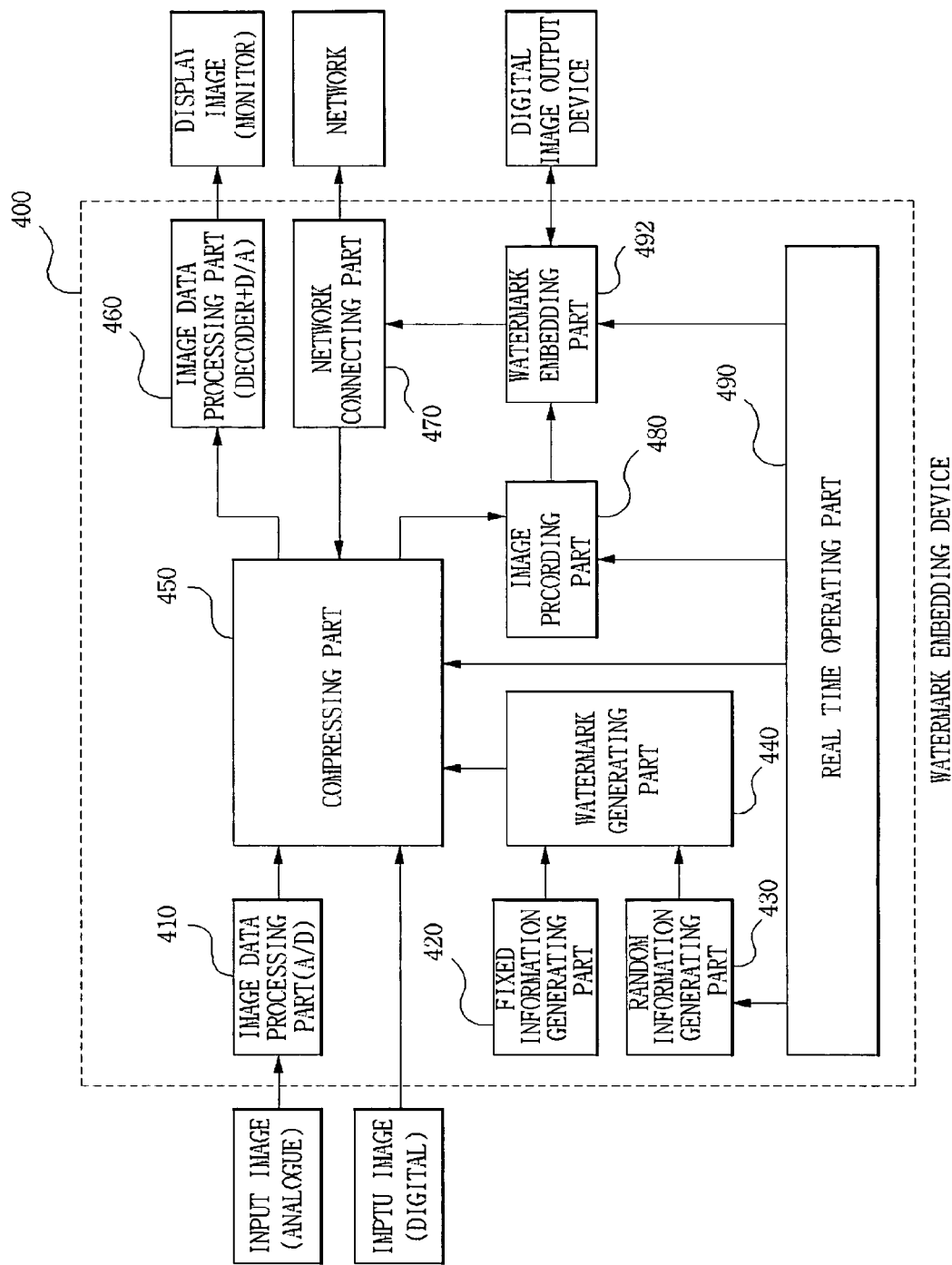
FIG. 4 is a block diagram showing the constitution of the system of the present invention embedding watermark after compressing the digital image.

The method for embedding watermark in accordance with the present invention can be divided as (1) the method for embedding watermark (in particular, RW) before compressing the digital image (FIG. 3a), (2) the method for embedding watermark simultaneously with compressing the digital image (FIG. 3b), and (3) the method for embedding watermark after compressing the digital image (FIG. 4). Such will be described with reference to FIGS. 3 to 4 in the following.

FIG. 3a is a drawing showing the constitution of embedding watermark before compressing the digital image. Such compression of digital image and embedment of watermark are performed at the compressing and watermark embedding part (300a) in the system of FIG. 1 or FIG. 2.

Digital images are first inputted into the RW embedding part (310a). The RW embedding part (310a) is wherein robust watermark is embedded into digital image. At this time, the robust watermark is embedded at the spatial domain.

The image compressing part (320a) is where digital images embedded with RW are compressed using compression methods such as MPEG, MJPEG, Wavelet, etc., and the FW embedding part (330a) is where fragile watermark is embedded into the compression stream.

In the embodiment of FIG. 3a, FW is embedded simultaneously with compressing the image. That is, fragile watermark is embedded while compressing digital images, and accordingly, compared with prior art, the embedment rate of the watermark is very fast. This is because the FW was embedded after compressing the digital data in prior art. In this case, in order to embed watermark into the compressed file, the compressed file is restored again and then embedded with FW. After embedding FW, it had to go through the compressing process again, and thus it was difficult to embed FW in real time. However, in the present invention, FW is embedded during the compressing process, and thus the process for restoring the compressed file is not required. Detailed description on embedding FW and compressing the image simultaneously will be described in detail in the following.

FIG. 3b is a drawing showing the constitution of embedding watermark simultaneously with compressing the digital image. That is, it is an embodiment compressing digital image, embedding RW and embedding FW simultaneously.

At this time, the region embedding RW and the region embedding FW in the digital image may overlap or may differ. However, in order to minimize the effect extracting RW due to the embedment of FW when extracting RW, it is preferable for RW and FW to be embedded and extracted at different domains. Detailed description on embedding RW and FW and compressing the image simultaneously will be described in the following.

FIG. 4 is a block diagram showing the constitution of the system of the present invention embedding watermark after compressing the digital image. That is, different from the embodiments of FIG. 1 to FIG. 3, RW and/or FW is not embedded simultaneously with compression, but is embedded when sending the compressed image data which is recorded outside.

In particular, the embodiment of FIG. 4 is a technology appropriate to be applied to the DVR which currently does not have a watermarking function. That is, this is a case wherein the RW and/or FW is embedded into a digital image at a separate watermark embedding part (492) after recording the digital image which is shot at the image recording part (480) inside the DVR by first compressing it at the compressing part (450).

Since the watermark is embedded into a compressed image data after compressing and recording the digital image in the embodiment of FIG. 4, it is not necessary for the watermark to be embedded in real time.

The method for embedding watermark into a compressed digital image will be described in the following referring to when the digital image is MPEG compressed and when it is wavelet compressed.

Figure 5A:
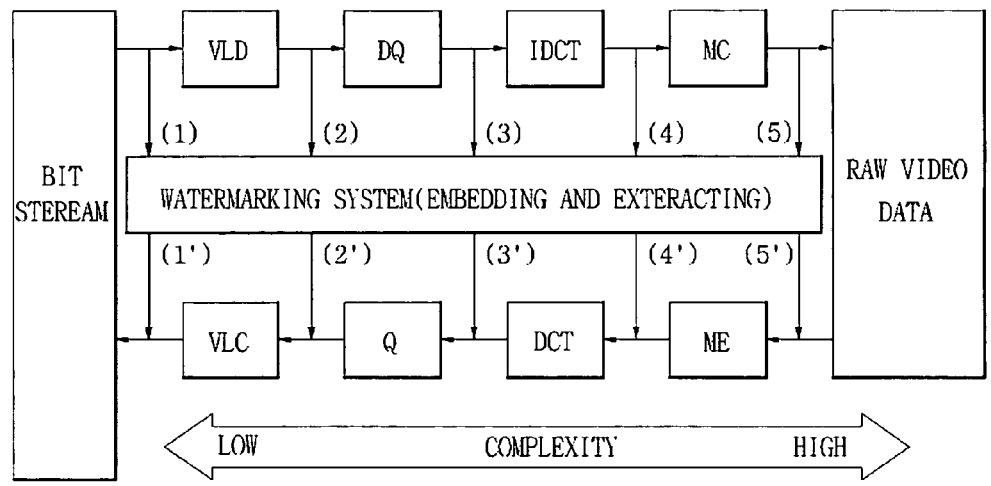
FIG. 5*a* is a drawing showing the process for embedding watermark into an MPEG compressed digital image.

FIG. 5a is a drawing showing the process for embedding watermark into an MPEG compressed digital image.

When a bit stream obtained by compressing a digital image is inputted into a watermark embedding part, before embedding watermark, it is decoded so that the watermark is embedded after being decompressed. Then, it is compressed again and restored to the original bit stream.

Referring to FIG. 5a after going through the variable length decoding (VLD) process, the inputted MPEG bit stream goes through the dequantization process. The dequantized coefficient goes through inverse discrete cosine transform (IDCT), and the bit stream is restored to the raw video data of the spatial domain through motion compensation (MC).

In order to make an MPEG bit stream from the raw video data again, motion estimation (ME) is first performed, and then the data obtained using said process is discrete cosine transformed in a unit of macro blocks. The discrete cosine transformed coefficient goes through quantization (Q) and variable length coding (VLC) process, and becomes an MPEG bit stream again.

Among the process for restoring an MPEG bit stream to a raw video data and the process for making the raw video data into an MPEG bit stream again as in FIG. 5a, the method for embedding and extracting watermark may be performed by the five possible methods described in FIG. 5a, that is methods (1), (1')~(5), (5').

The method for embedding and extracting watermark in (1), (1') is a method for embedding watermark without decoding the MPEG bit stream at all. Therefore, the method for embedding and extracting watermark is not complex but the embedded watermark lacks robustness.

Meanwhile, the method for embedding and extracting watermark in (5), (5') is a method wherein the MPEG bit stream is decoded to the raw video data, and then the watermark is embedded at the spatial domain and compressed again. Therefore, compared with the other method, it has excellent robustness but has a complex embedment and extraction algorithm.

In the present invention, among said possible methods, watermark is embedded and extracted at a compressed MPEG bit stream using method (2), (2'). Detailed description on the method for embedding and extracting watermark will be described in the following.

Figure 5B:
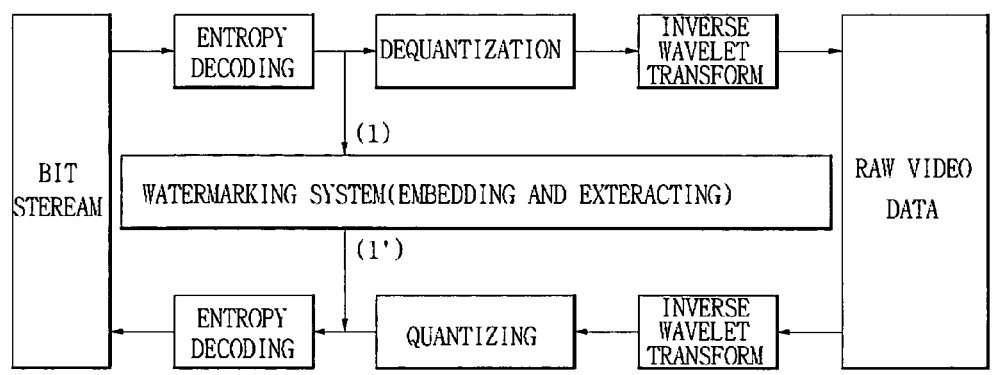
FIG. 5*b* is a drawing showing the process for embedding watermark into a wavelet compressed digital image.

FIG. 5b is a drawing showing the process for embedding watermark into a wavelet compressed digital image.

Referring to FIG. 5b, the inputted wavelet compressed bit stream is entropy decoded. The coefficients which went through entropy decoding go through dequantization. Then, after being inverse wavelet transformed again, it is restored to raw video image data.

The restored raw video image data is wavelet transformed, and the wavelet transformed coefficient is quantized. Then, the quantized coefficient is entropy coded and a wavelet compressed bit stream is obtained again.

In the present invention, among the above processes, watermark is embedded and extracted by process (1), (1').

The method for embedding and extracting watermark will be described in detail in the following.

Next, referring to FIG. 6a and FIG. 6b, the device for authenticating digital image embedded with watermark and method thereof in accordance with the embodiments of FIG. 1 to FIG. 5 will be described.

Figure 6A:
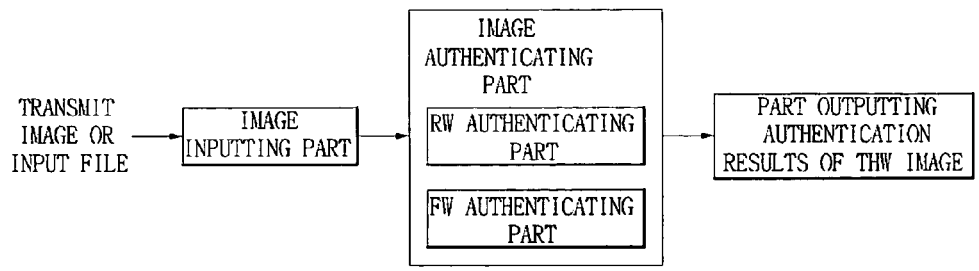
FIG. 6*a* is a block diagram showing the schematic constitution of the device for authenticating digital images embedded with watermark.
Figure 6B:
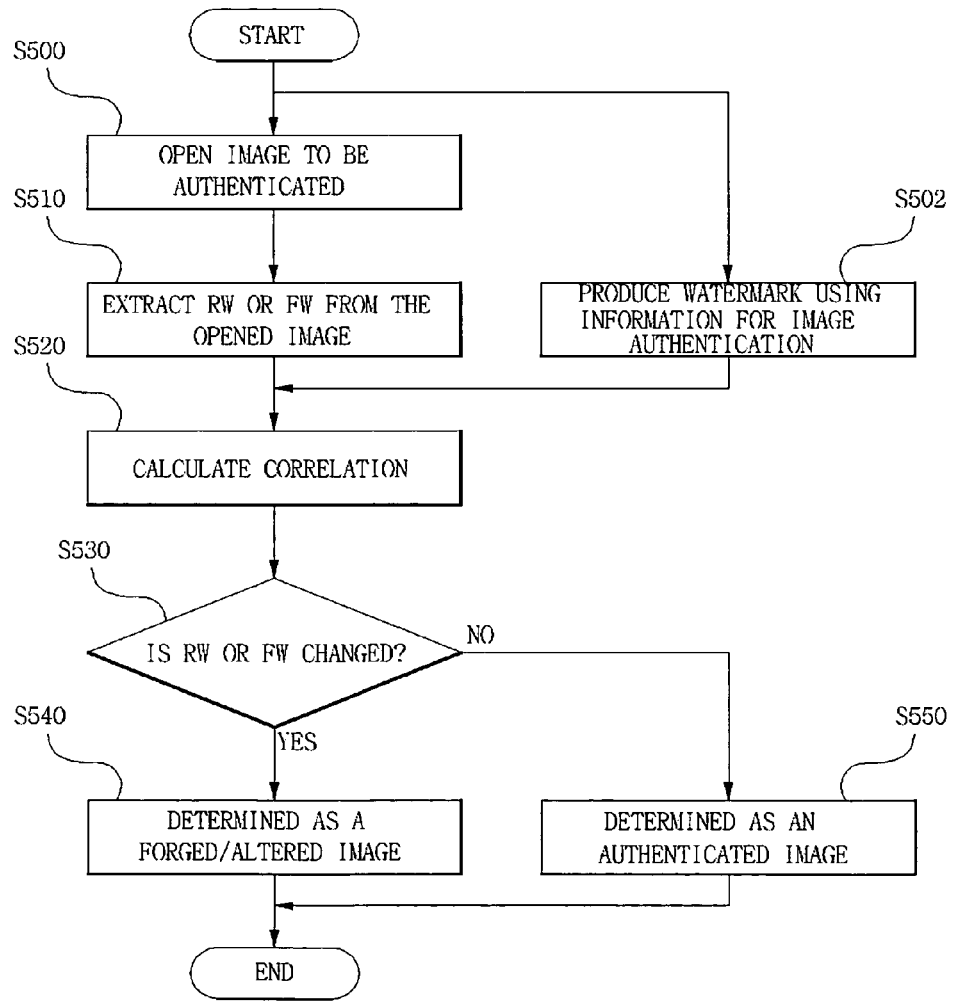
FIG. 6*b* is a flow chart showing the method for authenticating a image by extracting RW or FW from a digital image embedded with watermark.

FIG. 6a is a block diagram showing the schematic constitution of the device for authenticating digital images embedded with watermark, and FIG. 6b is a flow chart showing the method for authenticating images by extracting RW or FW from a digital image embedded with watermark.

The authentication of images as above is generally performed off-line. In general, forgery/alternation is determined after receiving the image data to be authenticated from the PC. That is, image authentication using such watermark detection is not performed in real time, but mainly in a predetermined period of time using a separate device after the image is recorded.

Referring to FIG. 6a, the image inputting part receives the digital image to be authenticated, and transforms the image so that the watermark can be easily extracted from the inputted image. The image authenticating part comprises an RW authenticating part authenticating images by extracting RW, and an FW authenticating part authenticating images by extracting FW. Part outputting authentication results of the image is the part displaying authenticating results of the image authenticating part.

Referring to FIG. 6b, first the image to be authenticated is opened (S500), and the RW or FW is extracted from the opened image (S510). Also, the watermark (RW or FW) embedded during the process for recording the image which is shot is obtained using information for image authentication (S502).

In order to determine whether the extracted RW or FW have been changed, said extracted watermark and the watermark obtained using information for image authentication are compared with each other, and its correlation is calculated (S520).

According to the correlation calculated from the above result, it is determined whether RW or FW have been changed. If it is determined that the watermark was changed, the image is determined as a forged/altered image and the location of forgery/alternation is detected (S540). If not, the image is determined as an authenticated image (S550).

The method for embedding and extracting a characteristic watermark of the present invention will be described in the following referring to the robust watermarking method and fragile watermarking method. Also, each method will be described in accordance with the watermark method at the wavelet transformation domain and at the discrete cosine transformation domain.

1. Robust Watermarking Method

In order to embed robust watermark simultaneously with compression, a method for embedding watermark by circular-shifting the pseudo-random sequence generated by a secret key by the distance d which is the information to be embedded is used.

Figure 7A:
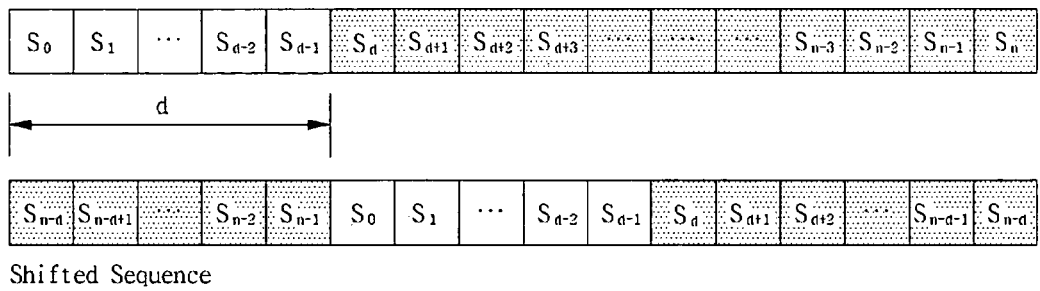
FIG. 7*a* is a drawing showing the method for circular-shifting a pseudo-random sequence.

FIG. 7a is a drawing showing the method for circular-shifting the pseudo-random sequence.

Referring to FIG. 7a, in this method, pseudo-random sequence is circular-shifted and the shifted d is the watermark information. Therefore, according to the length of the pseudo-random sequence generated, the payload which can be embedded is determined. That is, the amount of information is determined. When 1024 pseudo-random sequences are generated, if circular shifted, since $2^{10}=1024$, 10 bits of watermark information in maximum can be embedded.

In the method of the present invention, the random sequence for embedding a 10 bits data which is "0000000010", that is a random sequence ($w_2$) circular-shifted by the distance 2 from the original random sequence (w') is used as the watermark (w). This can be described as the following equation (1).

$$w = w_2 \quad (1)$$

The present invention is noticeable in that the process for producing watermark is performed at a transformation plane. That is, watermark is embedded using the frequency transform used during the compression process. Also, in order to establish a better reliability, the present invention leaves an allowable error band by slightly reducing the payload. This is because the sequence formed at a transformation plane is robust against transformation such as compression, etc. compared with noises formed at a spatial domain.

Figure 7B:
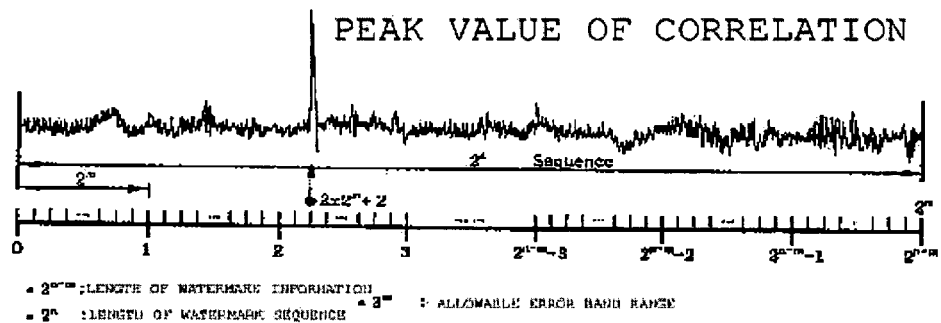
FIG. 7*b* is a drawing showing the peak value of the correlation when detecting watermark in accordance with the circular-shifting method.

FIG. 7b is a drawing showing the peak value of the correlation when detecting watermark in accordance with the circular-shifting method.

That is, by qunatizing the $2^n$ sequences into $2^m$ intervals as described in FIG. 7b, an allowable error band has been given to the peak value of the correlation when detecting the watermark, and thus obtained reliability.

Since watermark sequence is generated at the transformation domain, a lot of bit error may be generated when the peak value is detected being slightly shifted by external reasons in calculating the correlation. Therefore, in order to prevent this, an allowable error band of the peak value of the correlation has been given.

For example, in FIG. 7b it is shown that the peak value of the correlation is obtained at $2 \times 2^m + 2$. The watermark information detected from this is $(2 \times 2^m + 2)/2^m = 2.xxxx$. If this is mapped by the representative value 2, the detected watermark bit obtains a watermark information corresponding to (n-m) bit length, i.e., $2 = (0000 \ldots \ldots 0010)_b$. This can be generalized as the following equation (2).

$$Info = \left\lfloor \frac{2^n}{2^m} + 2^{m-1} \right\rfloor \quad (2)$$

$\lfloor \ \rfloor$: Truncation $2^n$: length of the random sequence $2^m$: allowable error band width The reason $2^{m-1}$ has been added here is to round off the numbers, and Info indicates the binary data having the length of (n-m) bits.

The method for embedding watermark at the wavelet transformation domain and discrete cosine transformation domain using said circular shifting method and a method for detecting the same will be described in the following.

(1) Robust Watermarking Method at the Wavelet Transformation Domain.

Since video data are usually row of continuative images, the image watermarking method can be applied as it is. However, the biggest problem for using the image watermarking method as a video watermarking method as it is, is the complexity of its calculation. Reducing the complexity of its calculation is the most important problem to be overcome in the current video watermarking method.

The present invention also provides various technical suggestions for establishing the robustness of the watermark at the transformation domain while reducing the complexity of the calculation. Video watermarking technology can also embed watermark by using the frequency transformation method or spatial domain method in a manner similar to image watermarking method.

Since the spatial domain method is fragile to compression, the algorithm suggested in the present invention uses the frequency domain method focusing on compression. The transforming method used for the frequency domain method includes DCT, FFT, DWT, etc. The discrete wavelet transform (DWT) method can generally transform the image to a desired band, and can randomly select a band robust to compression.

However, when embedding watermark by the frequency transformation method, it is difficult to perform embedment in real time, which is essential in the moving image watermarking method. This is because the signal should be transformed every time the watermark is embedded in the transformation method. Therefore, a technology for performing the transformation method in real time and for maintaining robustness to compression and exterior attacks has been developed in the present invention. Such technology will be described in the following.

Figure 8A:
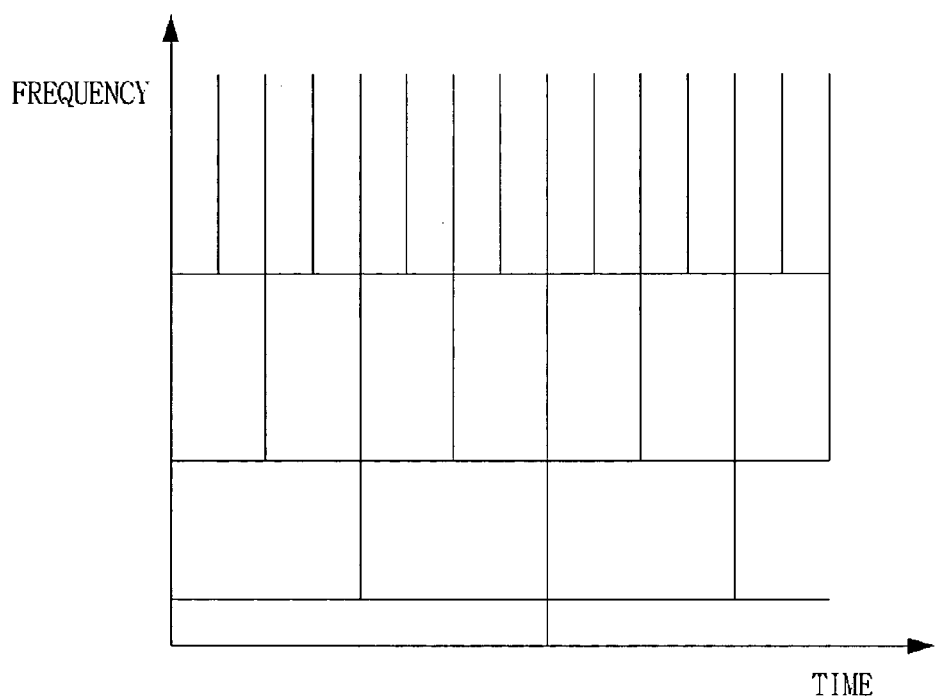
FIG. 8*a* is a graph showing the time of wavelet transform and dissolving capacity of the frequency domain.

FIG. 8a is a graph showing the time of wavelet transform and dissolving capacity of the frequency domain. Referring to FIG. 8a, it can be seen that when analyzing signals, the window size is smaller on the time axis for signals with high frequency, and the window size is larger on the time axis for signals with low frequency. Therefore, when using the wavelet transform, not only information on frequency but also information on time can be known for each band. Also, it is possible to deal with only the signal of a desired band because signals can be divided into bands.

Figure 8B:
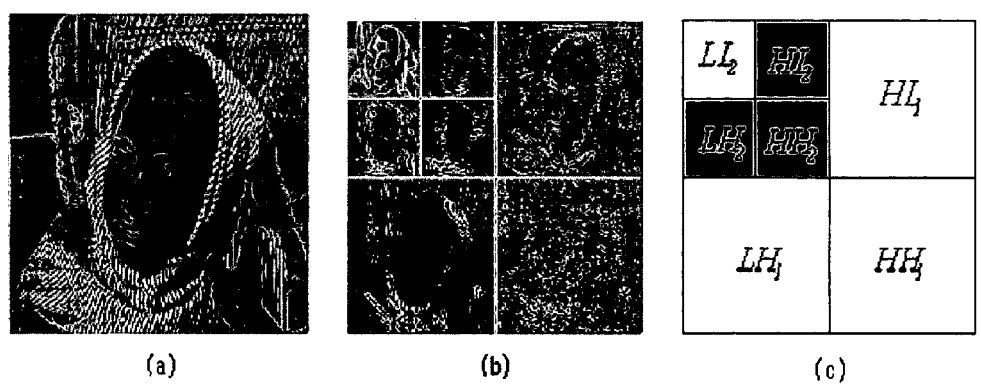
FIG. 8*b* is a drawing showing an image wavelet transformed into level 2.

Each band which have been wavelet transformed includes a frequency domain more inclusive than that of FFT. In general, as for images, since they are mainly low frequency images, the energy value is larger at low frequency bands. Also, when MPEG compression is performed, the approximation of image is performed from the low frequency domain. Therefore, the actual watermark itself also has to be embedded at a low frequency domain so that the watermark has a higher possibility to survive when being compressed. However, when embedding watermark at low frequency domain, even though it is robust to compression, it has a problem that it can be easily distinguished even by a slight change to the coefficient. However, when embedding watermark at high frequency domain, even though it cannot be easily distinguished, it has a problem that it is fragile to compression. Therefore, in order to select an appropriate band, a plurality of bands has been selected and an experiment has been performed. As a result, when $LH_2$, $HL_2$, $HH_2$ bands were used in an image wavelet transformed into level 2, it was robust to compression and not easily distinguished. FIG. 8b is a drawing showing an image wavelet transformed into level 2.

Now, referring to FIG. 9a and FIG. 9b, the process for embedding robust watermark at the wavelet transformation domain by the circular-shifting method of the present invention will be described in the following.

Figure 9A:
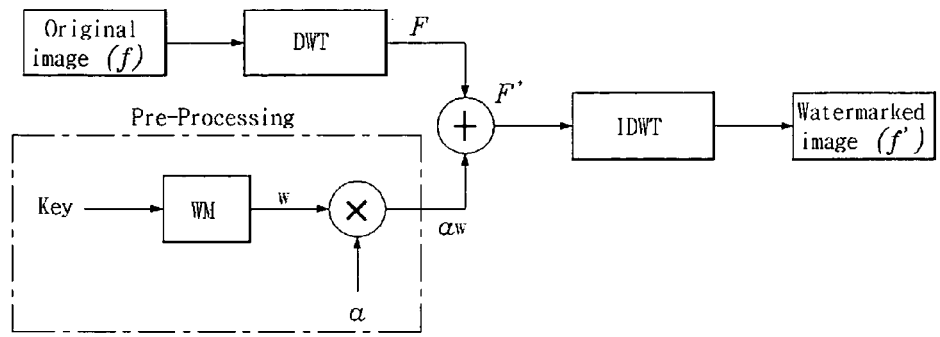
FIG. 9*a* is a block diagram showing the process for embedding robust watermark at the wavelet transformation domain.

FIG. 9a is a block diagram showing the process for embedding robust watermark at the wavelet transformation domain.

In general, watermarking embedment is performed as in the following equation (3).

$$F'=F+\alpha w \quad (3)$$

Herein, F is the original image which has been wavelet transformed, α is the embedding strength, w is the watermark, and F' is the image embedded with watermark.

The watermark embedding process of FIG. 9a is characterized in that the process generates watermark on the transformation plane and is able to embed robust watermark simultaneously with compression (related to FIG. 4), and the specific process is described hereinbelow.

As a pre-processing step, first, a secret key is used to generate a pseudo random sequence at WM part. The pseudo random sequence is mapped as {−1, 1}. Next, the pseudo random sequence is circular-shifted by the distance d which indicates watermark information and a watermark sequence (w) of the transformation domain is generated.

The generated watermark sequence (w) is positioned to the selected band among the wavelet coefficient regions (for example, three regions in FIG. 8b). The coefficients of the entire bands excluding the embedded random noise will have the value '0'. The strength of the watermark sequence (w) is adjusted to a scaling factor (α) and becomes αw.

The original image (f) becomes wavelet transformed original image (F) through the discrete wavelet transform (DWT) at DWT part, and the wavelet transformed original image (F) is added to the strength adjusted watermark sequence (αw) at the transformation domain (that is, frequency domain) so as to become watermark embedded image (F'), and through the inverse discrete wavelet transform (IDWT) again, image (f') is generated at the spatial domain embedded with watermark on the transformation plane.

Meanwhile, according to the embodiment of FIG. 9a, the watermark embedded image (F') should be indispensably inverse transformed since the watermark was embedded at the wavelet region in order to become an image which can be seen at the spatial domain. As a result thereof, such method provides an effect of carrying out embedding of robust watermark and compressing the image simultaneously. However, every time watermarking is performed, the image should go through two processes of the wavelet transform (the wavelet transform and the wavelet inverse transformation), and thus it makes the process of embedding watermark in real time difficult.

As for a method capable of processing the embedding of the watermark in real time, a watermark embedding method such as the embodiment of FIG. 9b recited hereinbelow is available.

Figure 9B:
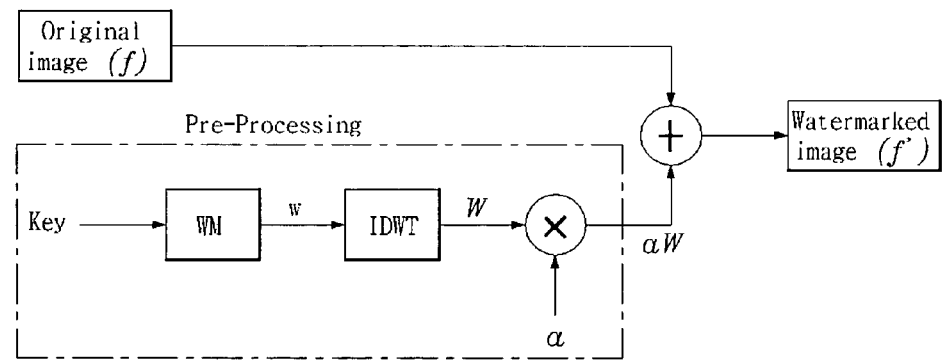
FIG. 9b is a block diagram showing another embodiment of the process for embedding robust watermark at the wavelet transformation domain.

FIG. 9b is a block diagram showing other embodiment of a robust watermark embedding process at the wavelet transformation domain.

The frequency transform techniques have the common characteristic of the following formulae (4) and (5)

$$f' \xleftarrow{T} F' \quad (4)$$

$$f + \alpha W \xleftarrow{T} F + \alpha w \quad (5)$$

That is, each of the transformation techniques has a linear characteristic, and such characteristic provides a solution for realizing real time watermark embedding.

If the watermark embedding algorithm such as FIG. 9b is realized (the detailed description thereof will be made later), it is not necessary to embed watermark by transforming to frequency domain every time, and even if the watermark is embedded at the spatial domain, an effect identical to that of the watermark embedded at the frequency domain is obtainable.

Such effect is obtainable by using a linear characteristic of transformation in which the addition operation at the spatial domain is also maintained at the transformation domain. Embedding watermark merely requires addition of watermark signals to the original image at the spatial domain. Accordingly, the complicated process of transforming images twice (that is, DWT and IDWT) is changed to enable performing real time watermark embedding by inverse transforming watermark and by carrying out addition at the spatial domain. The specific process is as follows.

As a pre-processing step, a secret key is used at the WM part to generate a pseudo random sequence. The pseudo random sequence is mapped as {−1, 1}. The pseudo random sequence is circular-shifted by the distance d which indicates watermark information and a watermark sequence (w) of the transformation domain is generated. The generated watermark sequence (w) is positioned to the selected band among the wavelet coefficient regions. The coefficients of the entire bands excluding the embedded random noise will have the value of '0'. The generated watermark sequence (w) will generate a watermark sequence (W) at the spatial domain through the inverse discrete wavelet inverse transformation at IDWT part.

The original image (f) is divided in a block unit of a size identical to the generated watermark sequence, and after the watermark sequence value corresponding to the pixels of the divided image blocks is scaled to a and added, watermark embedded image (f') of spatial domain is generated. Herein, α is a scaling factor reflecting the global and the local characteristics of the image.

Such robust watermarking algorithm suggested by the present invention uses the wavelet transform method to embed watermark. Also, in order to increase the embedding payload, the shift watermark technique was used, and for the real time embedding, the linearity of the transformation method was used. (Embodiment of FIG. 9b)

Figure 9C:
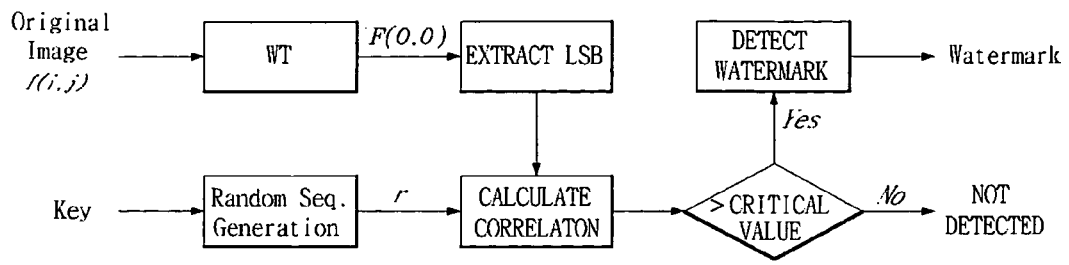
FIG. 9c is a drawing showing the process for detecting robust watermark at the transformation domain.
Figure 9D:
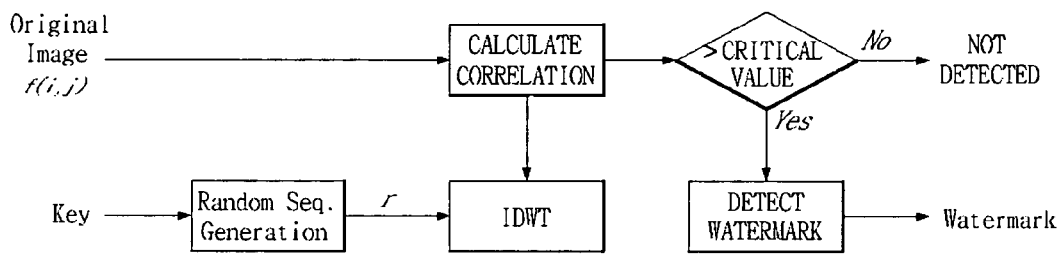
FIG. 9d is a drawing showing the process for detecting robust watermark at the spatial domain.

Next, referring to FIG. 9c and FIG. 9d, the process for detecting watermark from the image embedded with the robust watermark at the above wavelet transformation domain is described. FIG. 9c is a drawing showing the process of detecting the robust watermark at the transformation domain, and FIG. 9d is a drawing showing the process of detecting the robust watermark at the spatial domain.

Referring to FIG. 9c, first, pixel image of the spatial domain is obtained, and after the pixel image is divided into block units used in the watermark embedding process, the wavelet transform is performed in block units.

The cross correlation between the wavelet coefficients of the particular band embedded with watermark of the wavelet transformed block images and the random noise generated by the key used in the watermark embedding process is calculated. If the input image is embedded with watermark, a peak exists and if such peak is bigger than the temporary critical value, it is determined to be an image embedded with watermark and the watermark is interpreted. Herein, the position of the peak becomes watermark information. If peak is smaller than the critical value, it is determined that watermark is absent.

The embodiment of FIG. 9d is related to an embodiment for calculating the correlation at the spatial domain and for detecting watermark.

Figure 10:
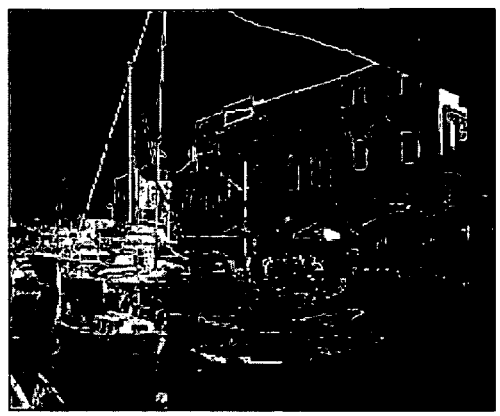
FIG. 10 is a drawing showing the image embedded with robust watermark in accordance with the present invention.
Figure 10:

The image after embedding watermark information by using the watermark algorithm suggested above is indicated in FIG. 10. FIG. 10 is a drawing showing the image embedded with robust watermark according to the present invention. The left image is the original image and the right image is the image embedded with watermark. It is not possible to visually distinguish whether watermark has been embedded, and also PSNR is at least 40 dB. As a result of having 352×288 image as the object, the following Table 1 is obtained.

TABLE 1

| Subject of Examination | Performance |
| --- | --- |
| Embedding speed | 0.01 second/frame or less |
| Extracting speed | 80 bits/10 seconds |
| Rate of detection | MPEG1.2: 100% (1.5 Mbps) |
| PSNR | 40 dB or more |

(2) Robust Watermarking Method at the Discrete Cosine Transformation Domain

The discrete cosine transform (DCT) is currently the most generally used transform for compressing still image or moving image. The present invention embeds watermark by using the shift sequence watermarking method into LSB of DC or AC coefficient among DCT coefficients of the intra frame for embedding watermark in real time at the discrete cosine transformation domain. If this method is used, watermark can be embedded very simply and efficiently, and characteristics very robust against compression are shown.

Further, this method can detect watermark embedded at the spatial domain from the transformation domain, and has interoperability wherein its reverse is also possible. (specific description in this regard will be made later) The embodiment of the present specification uses DCT DC coefficient for embedding simple watermark, but in order to increase payload or robustness of watermark, AC coefficients of the low frequency domain can be used with the same method. As the DCT AC coefficients are used, many data can be embedded more robustly. However, a disadvantage occurs wherein the degree of complicated calculation increases instead.

Figure 11A:
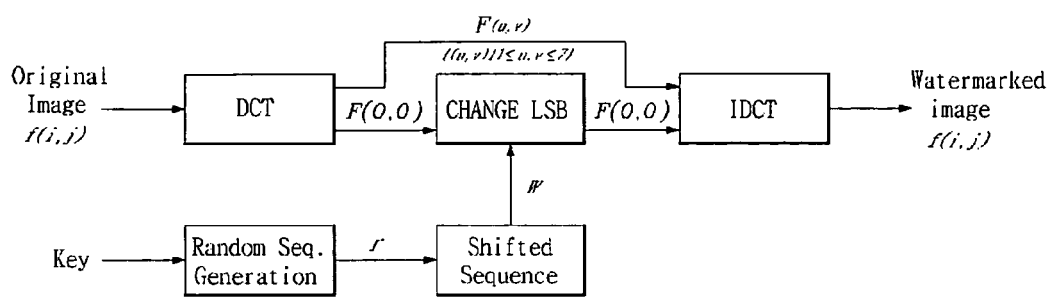
FIG. 11a is a block diagram showing the process for embedding robust watermark at the discrete cosine transformation domain.
Figure 11B:
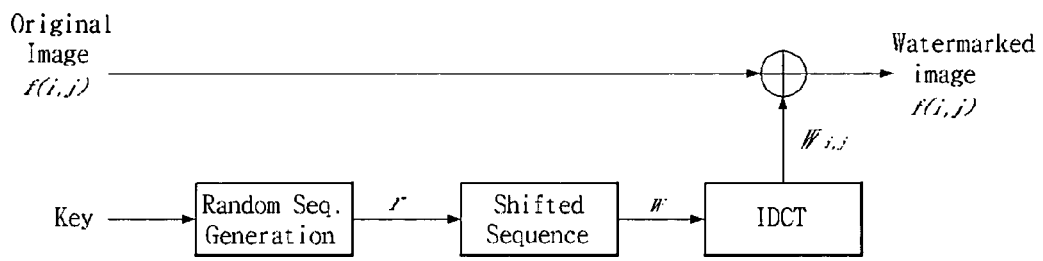
FIG. 11b is a block diagram showing another embodiment of the process for embedding robust watermark at the discrete cosine transformation domain.

Next, referring to FIG. 11a and FIG. 11b, the process for performing embedding robust watermark by the circular-shifting method of the present invention at the discrete cosine transformation (DCT) domain is described.

FIG. 11a is a block diagram showing the process of embedding robust watermark of the discrete cosine transformation domain.

The watermark embedding process of FIG. 11a is proceeded in 8×8 block unit such as MPEG which is the general compression standard.

Referring to FIG. 11a, the original image (f (i, j)) at the spatial domain is discrete cosine transformed in 8×8 block unit at DCT part, and at the random sequence generation part, a pseudo random sequence having a distribution of N (0, 1) by using a temporary secret key designated by a user is generated.

The generated pseudo random sequence (r) is circular-shifted by distance d which is watermark information at the shifted sequence part to generate a watermark sequence (w). At LSB changing part, LSB of DC or AC coefficients among the 8×8 block unit discrete cosine transformed coefficients is replaced with the watermark sequence (w). At the inverse discrete cosine transform part (IDCT), the image signals are inverse discrete cosine transformed again to output image (f' (i, j)) of the watermark embedded spatial domain.

As for a method enabling processing the watermark embedding in real time, a watermark embedding method such as the embodiment of FIG. 11b recited hereinbelow is available.

FIG. 11b is a block diagram showing other embodiment of a robust watermark embedding process at the discrete cosine transformation domain. FIG. 11b shows the embedding method identical to that of FIG. 11a, but the method is different in which embedding is not made at the transformation domain, but the embedding is proceeded at the spatial domain. That is, the image does not go through two processes of discrete cosine transforms (DCT and IDCT) as in FIG. 11a, but after watermark sequence (w) is inverse discrete cosine transformed, addition is performed at the spatial domain so as to embed watermark, which enables real time embedding of watermark. It is the same principle as the embodiment of FIG. 9b described above, and the linearity of the operation of the frequency transform is used. With regard to the pertinent coefficient at the time of establishing image value at the spatial domain, 8×8 pixel values are calculated for establishment and such pixel values are added to the corresponding pixels of the image.

Figure 11C:
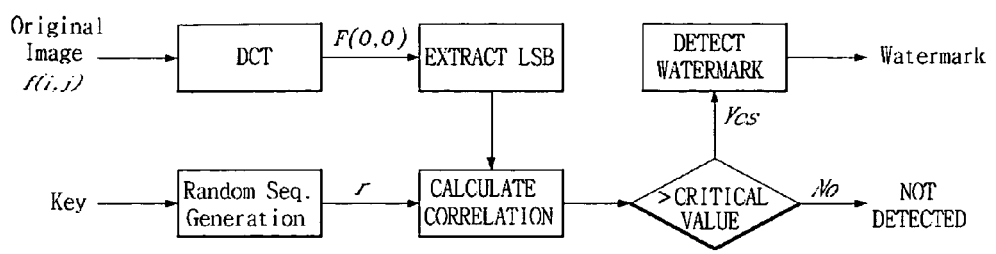
FIG. 11c is a drawing showing the process for detecting robust watermark at the transformation domain.

Next, referring to FIGS. 11c and 11d, a process for detecting watermark from the robust watermark embedded image at the above discrete cosine transformation domain is described hereinbelow. FIG. 11c is a drawing showing the robust watermark detection process at the transformation domain, and FIG. 11d is a drawing showing the robust watermark detection process at the spatial domain.

Referring to FIG. 11c, the random sequence generation part uses a secret key used during the watermark embedding process so as to make a pseudo random sequence comprised of {−1, 1}. After the watermark embedded image is discrete cosine transformed at the discrete cosine transform part, only LSB is extracted from the watermark embedded coefficients at the LSB extraction part so as to generate a sequence mapped as {−1, 1}.

At the correlation calculation part, a cross correlation between the pseudo random sequence generated by using the secret key and the extracted LSB sequence is calculated. The index d at a point in which the calculated correlation becomes the maximum is searched so as to detect the watermark information.

Figure 11D:
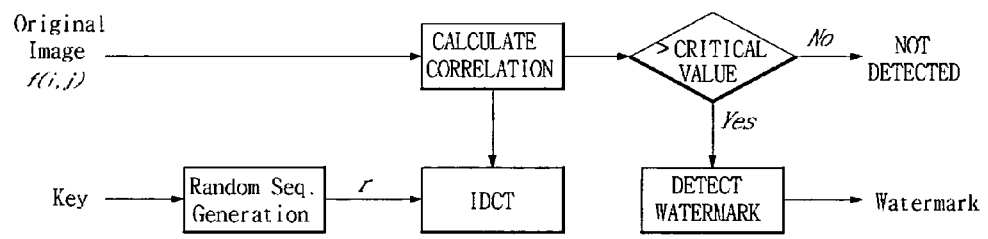
FIG. 11d is a drawing showing the process for detecting robust watermark at the spatial domain.

The embodiment of FIG. 11d is related to an embodiment detecting watermark by calculating the correlation of the spatial domain.

Figure 12:
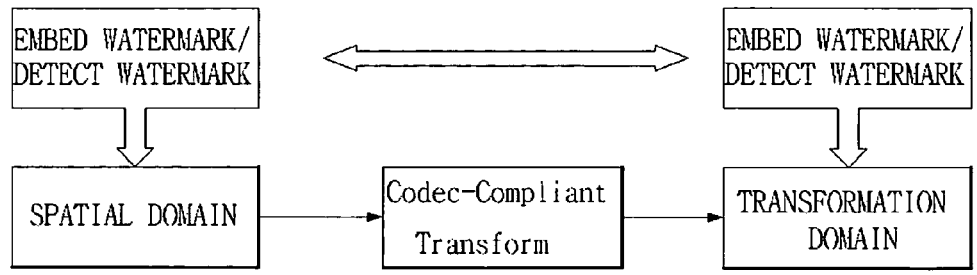
FIG. 12 is a drawing showing the interoperability of the watermarking method in accordance with the present invention.

Next, referring to FIG. 12, the interoperability which the robust watermarking method has at the above mentioned wavelet transformation domain and the discrete cosine transformation domain are described hereinbelow. FIG. 12 is a drawing showing the interoperability which the watermarking method has according to the present invention.

The characteristic so called the interoperability in the watermarking refers to the characteristic that all embedding and extraction watermark are possible regardless of whether watermarking embedding/extraction is carried out at the spatial domain or at the transformation domain, whereby the watermark embedded at the spatial domain is detected not only from the spatial domain but also from the transformation domain and also inversely, the watermark embedded at the transformation domain is detected not only from the transformation domain but also from the spatial domain.

Accordingly, the aforementioned robust watermarking algorithm suggested by the present invention can embed and extract robust watermark from both of the spatial domain or the transformation domain during the compressing process. Due to such characteristic, the compression and constitution of watermark embedding part at FIG. 3a and FIG. 3b are possible. "Codec-Compliant Transform" at FIG. 12 refers to the transform used to the corresponding compression standards, which in case of an MPEG compression, DCT is performed and in case of a JPEG2k, wavelet transform is performed.

The interoperability of the watermarking method of the present invention such as above is due to its transform method being a no-loss method. That is, such interoperability is due to the fact that during the discrete cosine transform or during the wavelet transform, the value before transform, and the value after transform and inverse-transform are almost identical to each other excluding the extent of quantization errors.

Further, such interoperability is due to the fact that the characteristic according to the linearity of the aforementioned transform, that is the characteristic of values added at the spatial domain during the watermark embedding process or watermark generating process is designed to be maintained even at the transformation domain. Such characteristic is explained specifically in the aforementioned FIG. 9a to FIG. 9d and FIG. 11a to FIG. 11d.

Till now, the characteristic of the robust watermarking method according to the present invention is described. Hereinbelow, the fragile watermarking method which is the characteristic of the present invention will be described, and such description will be made separately as the watermarking method at the discrete cosine transformation domain and the watermarking method at the wavelet transformation domain.

2. Fragile Watermarking Method

The fragile watermark is used to determine whether image has been altered/forged and to find the altered/forged region. Since the robust watermark can extract watermark information even in a case some portion of the original image has been altered/forged, it is impossible to find the accurate altered/forged region by embedding/detection of the robust watermark alone. Accordingly, in order to achieve the object of the present invention which is to prevent alteration/forgery of the digital image that is shot to be A/D transformed and to detect the altered/forged regions, the fragile watermark should be indispensably used. The fragile watermarking method suggested by the present invention is a method of embedding watermark simultaneously with the compression process, and a method of embedding fragile watermark in the bit stream compressed during the image compression process.

(1) Fragile Watermarking Method at the Discrete Cosine Transformation Domain

Figure 13:
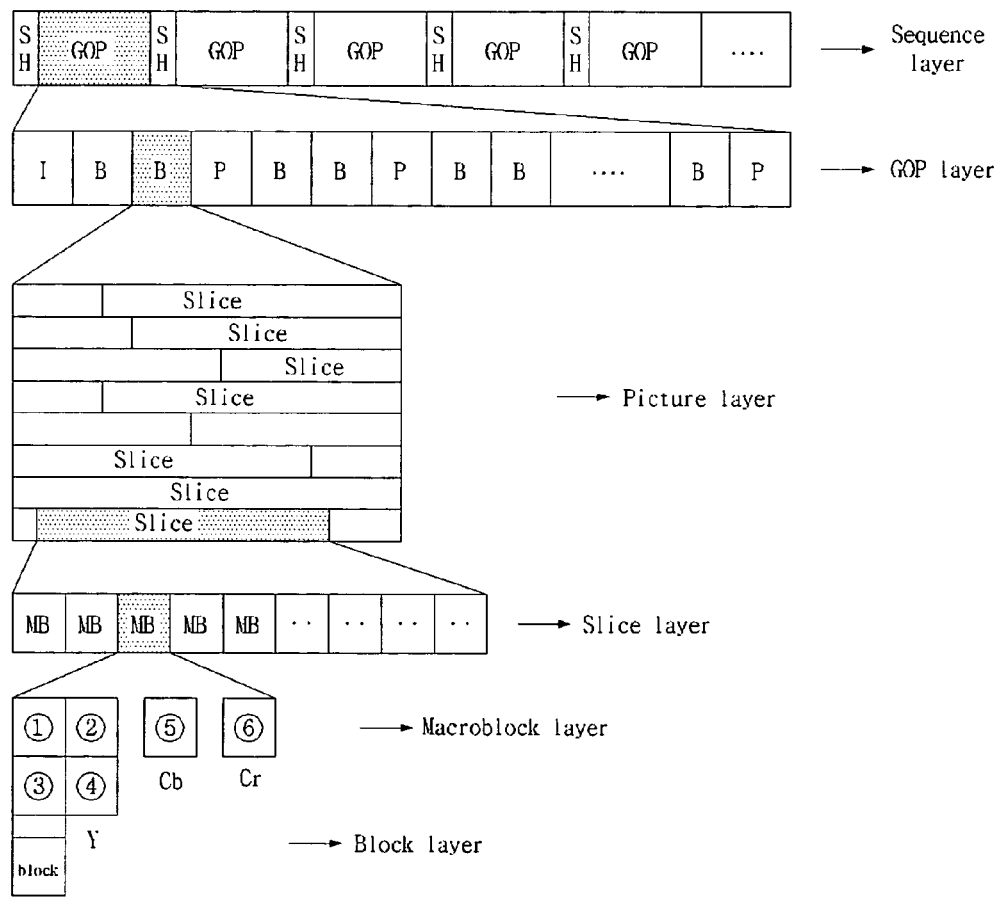
FIG. 13 is a drawing illustrating the MPEG structure.

The MPEG-2 structure which is the representative moving image compression format is illustrated in FIG. 13 in order to find the position of the embedded bit stream. FIG. 13 is a drawing showing the MPEG structure.

Referring to FIG. 13, the compression bit stream layer (sequence layer) is comprised of a multiple of GOPs (Group Of Pictures) and a header accompanied accordingly. As a lower layer, there is a GOP layer and the GOP layer is comprised of a multiple of pictures. Among the pictures, I refer to an Intra-Picture, B refers to a Bidirectionally predictive-Picture, and P refers to a Predictive-Picture, respectively.

The lower layer is a picture layer in which each picture comprises a multiple of slices. Each slice layer which is its lower layer is comprised of a multiple of Marco Block (MB). Each macro block layer is comprised of 4 block layers, and the data which compressed image signals corresponding to 8×8 pixels are stored in each block.

The present invention embeds and extracts the fragile watermark by a unit of macro blocks (MB). As such, since the present invention performs watermark embedding process in a unit of macro blocks used at the MPEG compression process, it is possible to embed watermark simultaneously with the compression during the compression process (see FIG. 3a and FIG. 3b). According to such embedding of watermark in a unit of macro blocks, the minimum unit capable of detecting the altered/forged region is the image area of 16×16 pixels.

Figure 14:
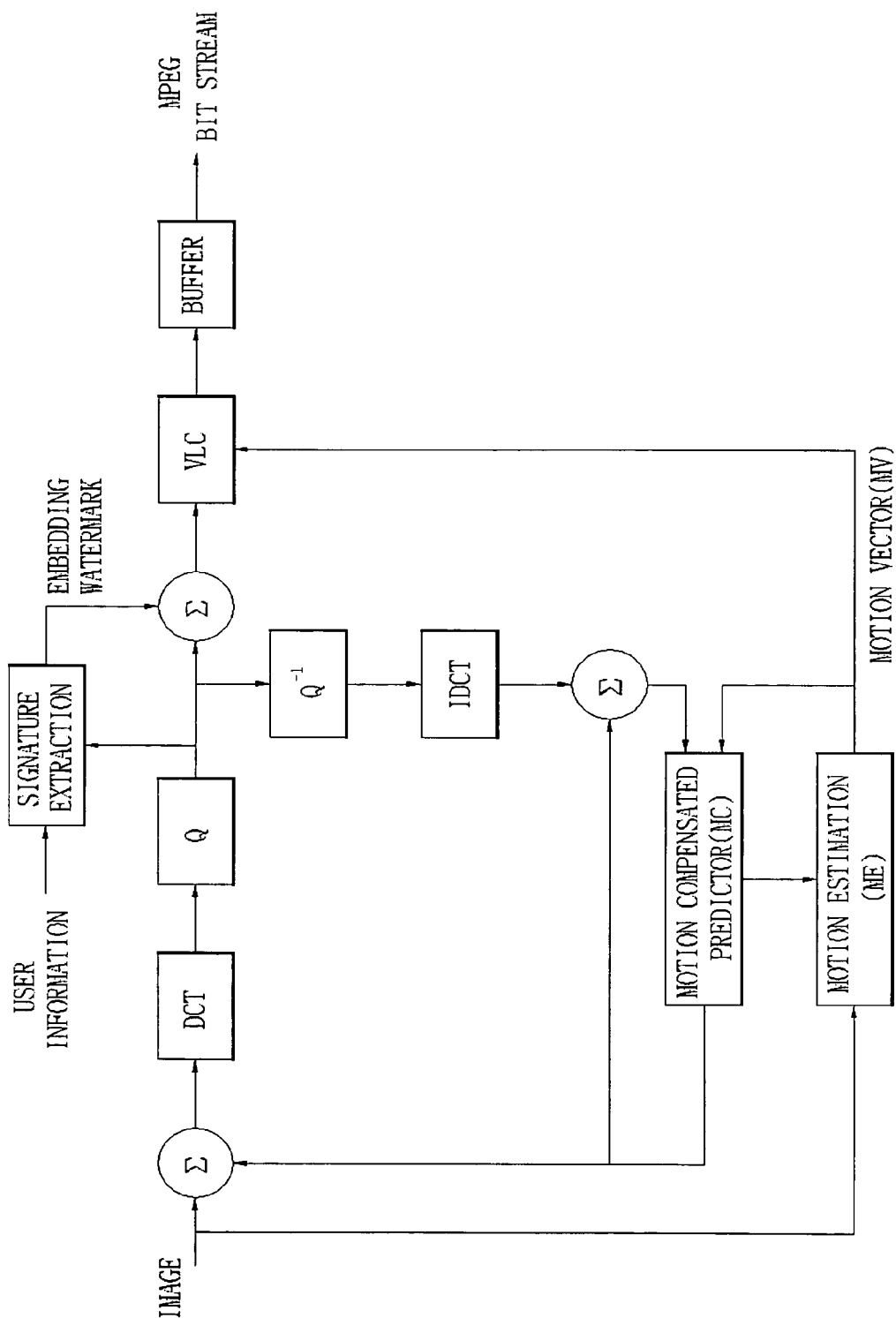
FIG. 14 is a block diagram showing the process for embedding fragile watermark simultaneously with compression during the MPEG compression process.

Referring to FIG. 14, the process of embedding watermark by using the quantized DCT coefficients during the process of performing MPEG compression is described. FIG. 14 is a block diagram showing the fragile watermark embedding process simultaneously with the compression at the MPEG compression process. That is, FIG. 14 is related to compression and embedding fragile watermark at the watermark embedding part simultaneously with the compression of the prior FIG. 3a and FIG. 3b.

The Motion Compensated predictor (MC) and the Motion Estimation (Me) are used to calculate the motion vectors.

The DCT part performs the discrete cosine transform (DCT) with regard to the inputted images. The quantization part (Q) is the part performing the quantization process, and both of the inverse quantization part ($Q^{-1}$) and the inverse discrete cosine transform part (IDCT) are parts used to generate motion vectors.

The present invention relates to embed watermark at the process of compressing MPEG, and the reason that it is possible to embed watermark simultaneously with the compression process is due to the fact that the present invention uses coefficients quantized after the frequency transform so as to embed watermark.

Specifically, in order to embed fragile watermark, the DCT coefficients quantized at the quantized part (Q) is divided into 2 parts. That is, the quantized DCT coefficients are divided into the DCT coefficient of the signature extraction region which is the part signature is extracted and the DCT coefficient of the watermark embedding region which is the part watermark information is embedded.

The preferable embodiment of the present invention uses a hash function as a method to extract the signature. As a hash function, any hash function can be used such as MD4, MD5, etc. However, the preferable embodiment of the present invention uses MD 5 (Message Digest 5).

The signature is extracted by using the quantized DCT coefficient of the signature extracting region, and the extracted signature is combined with the user information (for example, manufacturing company's unique number, product's unique number, etc.) to constitute watermark information. The constituted watermark information is again embedded into the quantized DCT coefficient of the watermark embedding region. In this regard, a method for selecting the signature extraction region and watermark embedding region can be carried out temporarily.

The variable length coding (VLC) is a method of compressing inputted data without any loss, which allocates a code with short length with regard to data inputted with generally high frequency and allocates a long code with regard to the data inputted with low frequency so as to compress inputted data with the minimum code on the whole.

The buffer is a place temporarily storing data of the present frames and the previous frames, which removes redundancy among the continuous frames in order to enhance the efficiency of compression. Through such process, the compressed MPEG bit stream embedded with fragile watermark is outputted.

The present invention embeds watermark (1) in a unit of macro blocks, or (2) in a unit of slices. Hereinbelow, description thereto is made separately.

First, description with regard to embedding watermark in a unit of macro blocks is made. Each macro block (MB) has a size of 16×16 and is constituted with four 8×8 DCT blocks. Each DCT block, as mentioned above, is divided into the signature extraction region and the watermark embedding region.

Figure 15:
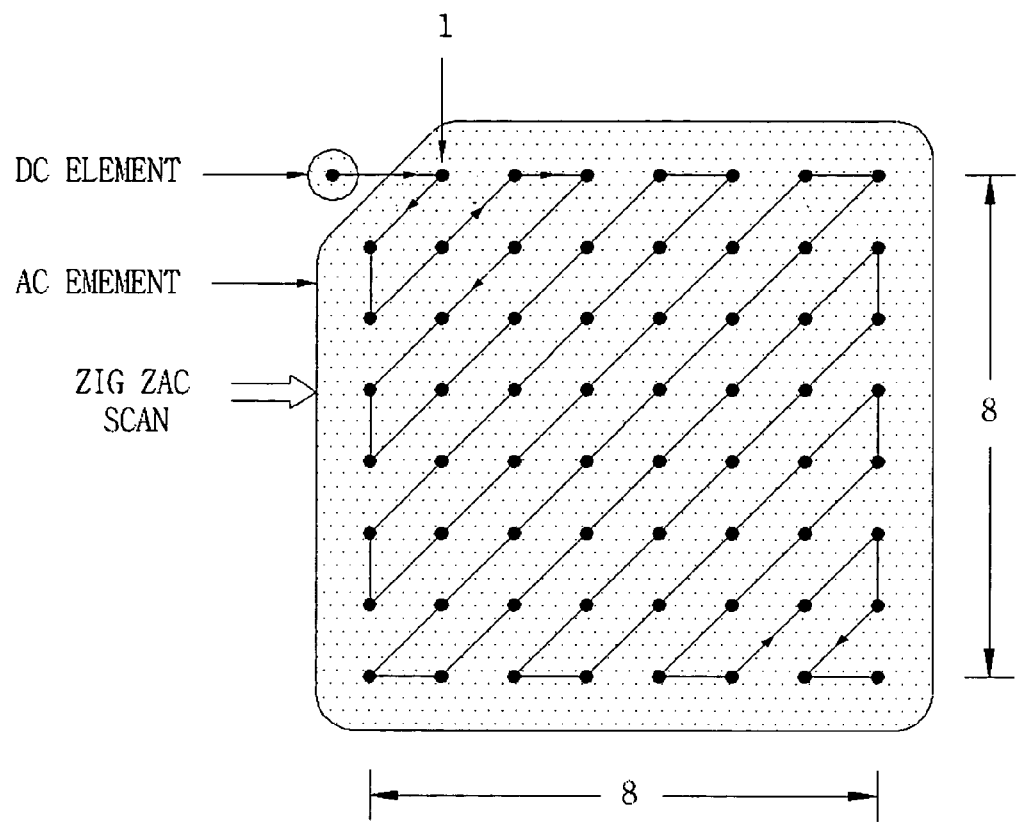
FIG. 15 is a drawing showing the zigzag scan of the DCT block.

FIG. 15 is a drawing showing the zigzag scan of the DCT block. The first embodiment of the present invention establishes coefficients of AC coefficient 6~20 of DCT at the zig zag scan of FIG. 15 as the watermark embedding region and establishes the remaining coefficients as the signature extraction region of course, such is merely one example for the sake of description, and it is obvious to a person skilled in the pertinent art to establish other temporary region as the signature extraction region and the watermark embedding region.

Figure 16A:
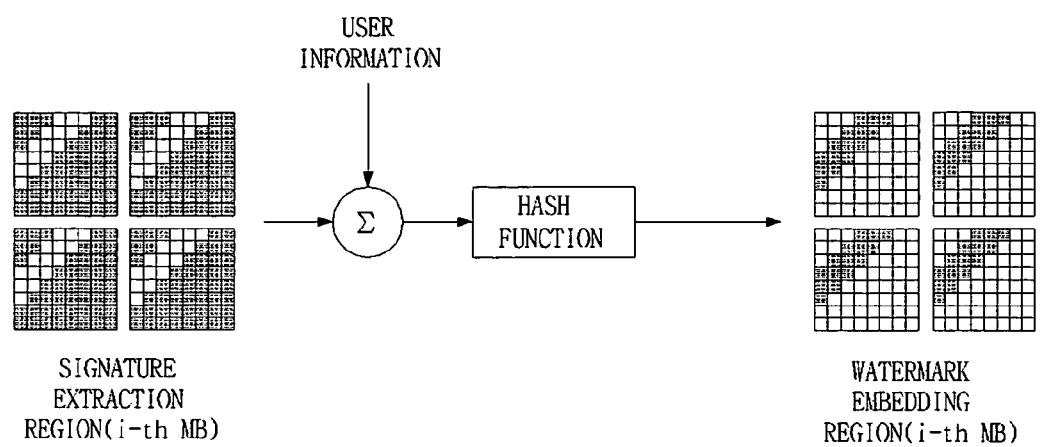
FIG. 16a is a drawing schematically showing the process for embedding watermark in a unit of macro blocks.

Hereinbelow, referring to FIG. 16a and FIG. 16b, a watermark embedding method in a unit of macro blocks is described. FIG. 16a is a drawing showing schematically the watermark embedding method in a unit of macro blocks, and FIG. 16b is a flow chart showing the watermark embedding process in a unit of macro blocks.

Figure 16B:
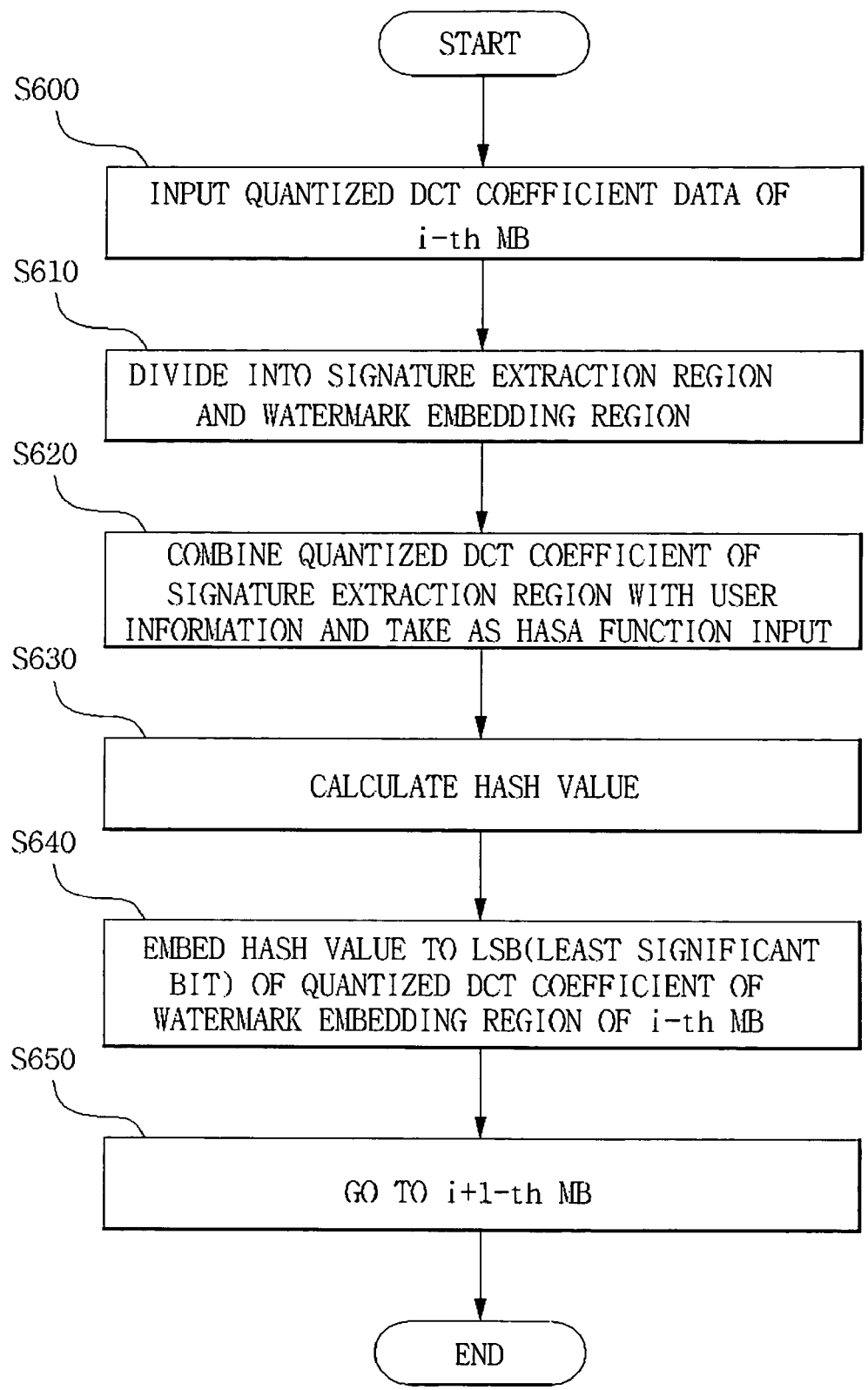
FIG. 16b is a flow chart showing the process for embedding watermark in a unit of macro blocks.

Referring to FIG. 16a and FIG. 16b, first, the quantized DCT coefficient data at the i-th macro block among every picture is input (S600). For each 8×8 DCT block of inputted macro blocks, such block is divided into the signature extraction region and the watermark embedding region (S610).

By combining the quantized DCT coefficient of the signature extraction region with the user information, input value of the hash function is taken (S620). The hash value which is the output value of the hash function is generated as the watermark information and outputted (S630), The hash value is embedded into the least significant bit (LSB) of the DCT coefficients of the watermark embedding region of the identical i-th macro block. (S640). Next, the watermark embedding process moves to the i+1-th macro block. (S650).

Figure 17A:
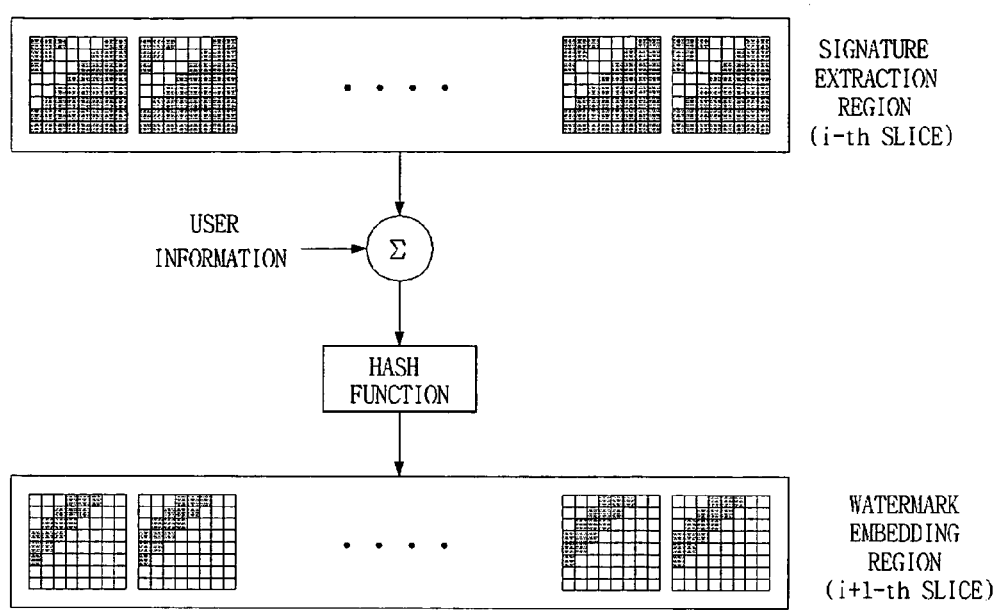
FIG. 17a is a drawing schematically showing the process for embedding watermark in a unit of slices.
Figure 17B:
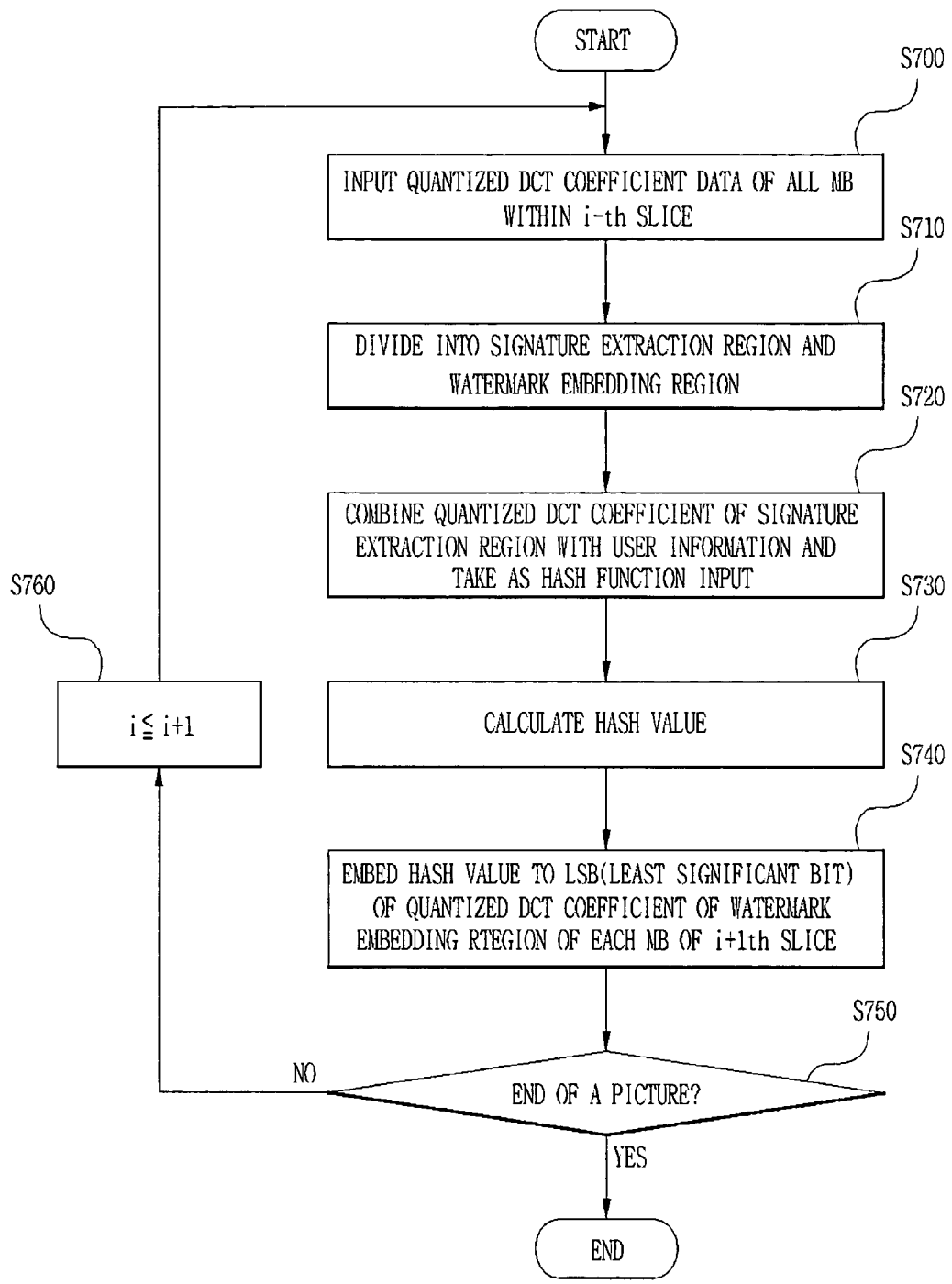
FIG. 17b is a flow chart showing the process for embedding watermark in a unit of slices.

Next, referring to FIG. 17a and FIG. 17b, the watermark embedding method in a unit of slices is described. FIG. 17a is a drawing schematically showing the watermark embedding method in a unit of slices, and FIG. 17b is a flow chart showing the watermark embedding process in a unit of slices.

Similarly illustrated in FIG. 13, one picture is comprised of a multiple of pictures. In a case of MPEG compression, most of the compression process is processed in a unit of macro blocks in order to realize in real time at the compression codec. As explained above, a single slice is comprised of a multiple of macro blocks. Accordingly, in order to embed watermark in real time, after extracting the signature values of the macro blocks of the previous slice and obtaining hash values, it is necessary to embed hash values as watermark into macro blocks of the next slice.

Referring to FIG. 17a and FIG. 17b, first, the quantized DCT coefficient data of all macro blocks in the i-th slice are input (S700). For each 8×8 DCT block of inputted macro blocks, such block is divided into the signature extraction region and the watermark embedding region (S710).

By combining the quantized DCT coefficient of the signature extraction region of macro block in the i-th slice with the user information, input value of the hash function is taken (S720). The hash value which is the output value of the hash function is generated as the watermark information and outputted (S730).

The hash value outputted accordingly is embedded into the least significant bit (LSB) of the quantized DCT coefficients of the watermark embedding region of each macro block in the i+1-th slice. (S740). Through such process, the process continues until the picture is ended (S750 and S760). The signature value of the signature extraction region of the macro block of the very last slice of the picture is embedded as watermark into the watermark embedding region of the macro block of the first slice of the next picture. By doing so, whether the picture has been missing or whether additional change is carried out can be known.

Figure 18A:
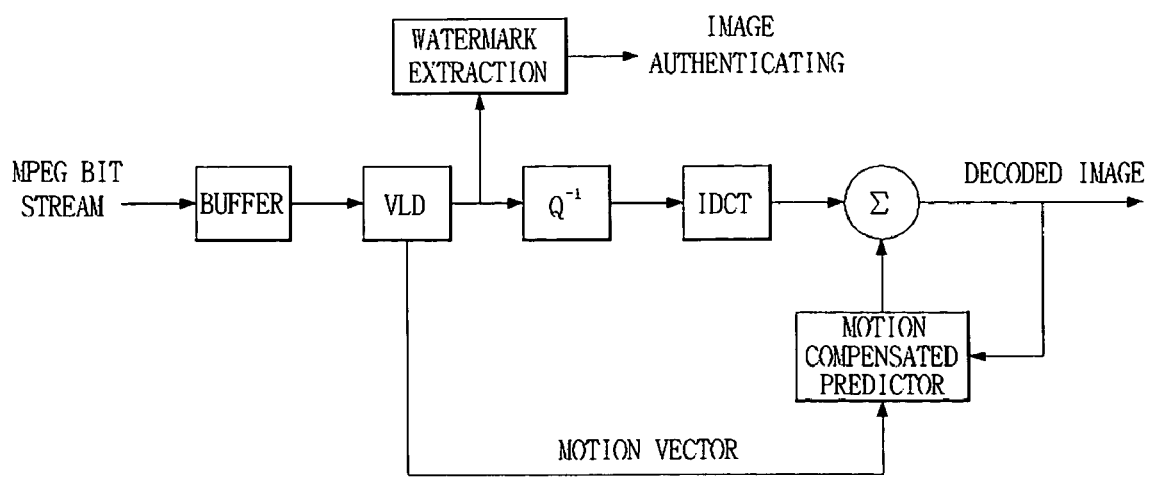
FIG. 18a is a block diagram showing the process for detecting fragile watermark from an MPEG compressed bit stream.
Figure 18B:
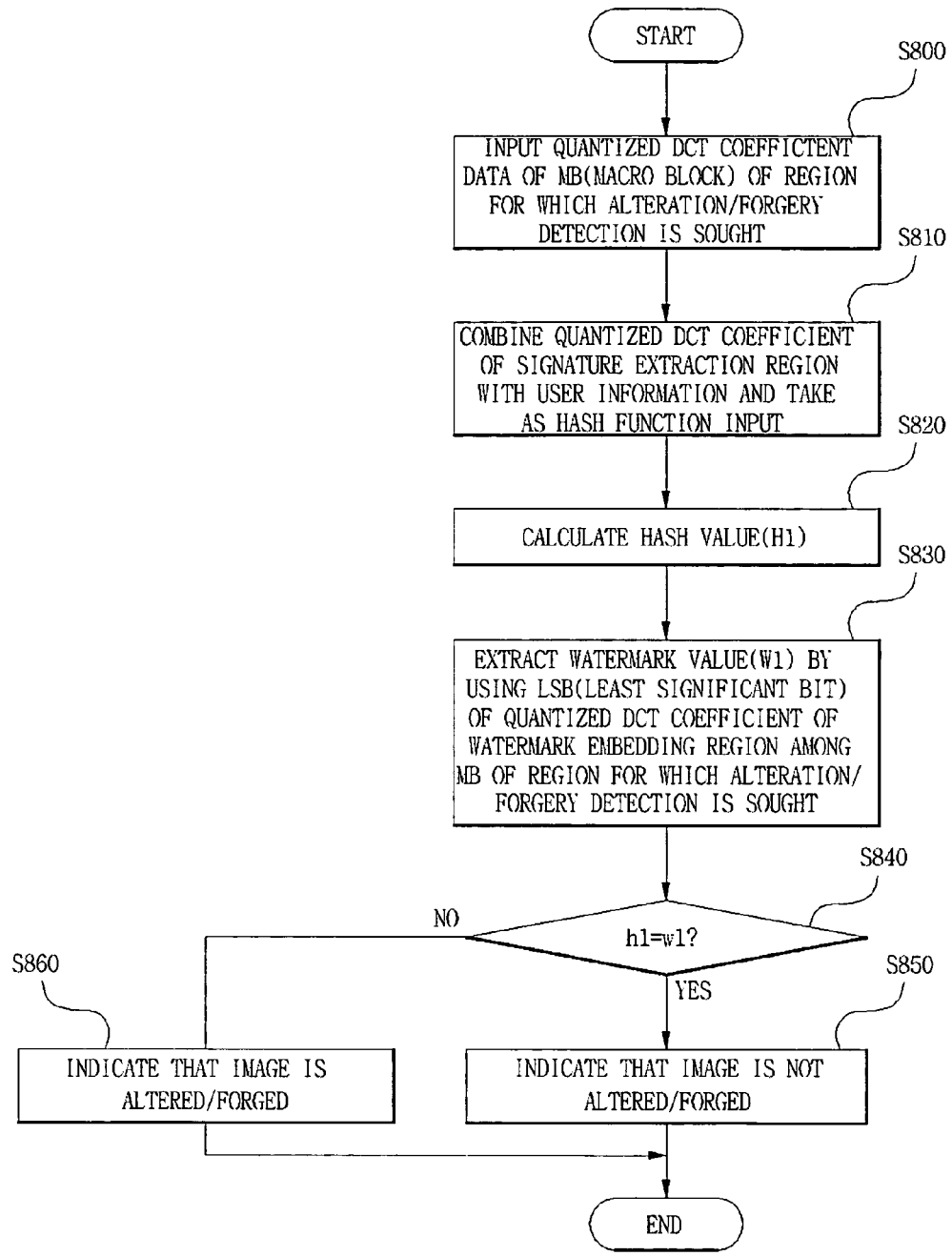
FIG. 18b is a flow chart showing the process for detecting fragile watermark from an MPEG compressed bit stream.

Next, referring to FIG. 18a and FIG. 18b, the process for detecting watermark from the image embedded with fragile watermark in a unit of macro blocks of the aforementioned is described. FIG. 18a is a block diagram showing the process of detecting fragile watermark from the MPEG compressed bit stream, and FIG. 18b is a flow chart showing the process of detecting fragile watermark from the MPEG compressed bit stream.

Referring to FIG. 18a, the inputted MPEG compressed bit stream is temporarily stored in the buffer, and the variable length decoding (VLD) is carried out therefrom to output the quantized DCT coefficients. In this regard, watermark extraction and the image authentication using the extracted watermark is carried out by using the quantized DCT coefficients outputted therefrom. The specific watermark detection process will be described referring to FIG. 18b.

Referring to FIG. 18b, first, the quantized DCT coefficients of the macro block of the region for which alteration/forgery detection is sought are input (S800). The quantized DCT coefficients of the signature extraction region identical to the region established at the time of embedding watermark among the inputted quantized DCT coefficients of the macro blocks are input, and by combing said coefficients with the user information, they are taken as input of the hash function (S810).

The output value (h1) of the hash function is calculated (S820), and the embedded watermark information (w1) is extracted by using the LSB value of the quantized DCT coefficients in the watermark embedding region among the quantized DCT coefficients of the macro blocks (S830).

It is determined whether the output value (h1) of the hash function is identical to the extracted watermark information (w1), and if it is identical, it means that alteration/forgery has not been made, and if not identical, it means that alteration/forgery has been made. Such process determines alteration/forgery of the image in a unit of macro blocks in case of embedding fragile watermark is in a unit of macro blocks, and determines alteration/forgery of the image in a unit of slices in a case of embedding fragile watermark is in a unit of slices.

Figure 19A:
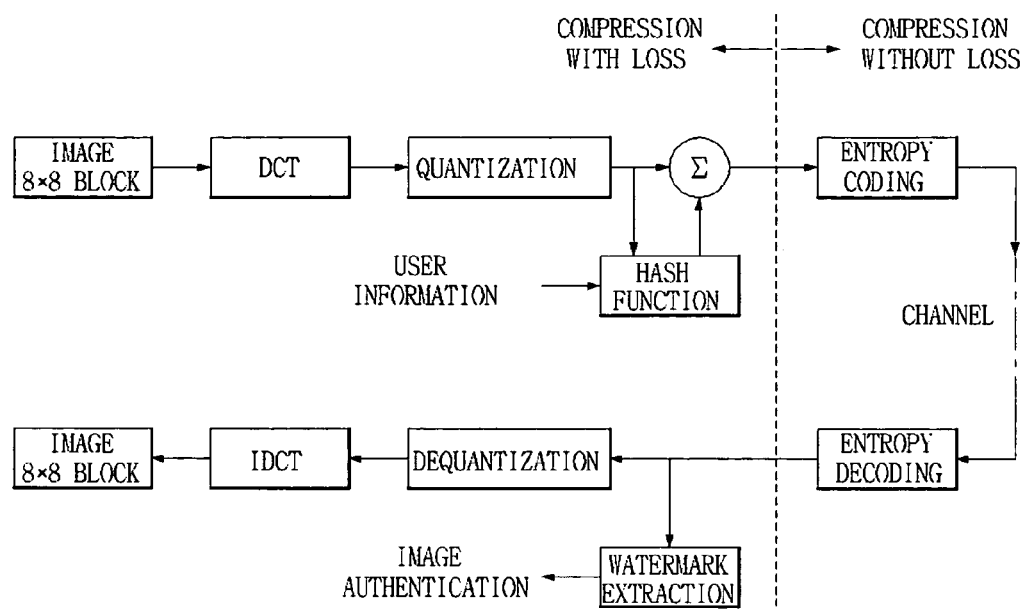
FIG. 19a is a block diagram showing the process for embedding fragile watermark simultaneously with compression during the JPEG compression process and a process for detecting watermark.

The fragile watermarking method in the discrete cosine transformation domain according to the present invention can be applied to the JPEG compression system which will be described later as well as the aforementioned MPEG compression system. FIG. 19a is a block diagram showing the fragile watermark embedding process simultaneously with the compression during the JPEG compression process and watermark detection process, and FIG. 19b is a drawing showing schematically the watermark embedding process during the JPEG compression process.

Referring to FIG. 19a, the image block in a unit of 8×8 pixels is discrete cosine transformed (DCT), and such block is quantized so as to perform compression. The quantized DCT coefficients are divided into DCT coefficients of the signature extraction region and the DCT coefficients of the watermark embedding region, and by using the quantized DCT coefficients of the signature extraction region, the signature is extracted, and the extracted signature is combined with the user information so as to constitute watermark information. The constituted watermark information is re-embedded into the quantized DCT coefficients of the watermark embedding region, and the watermark embedded image block is entropy coded so as to complete JPEG compression process and fragile watermark embedding process. The watermark detection is carried out by the process inverse to the above and therefore the description thereof is omitted.

In a case of JPEG, generally 8×8 pixel unit is DCT transformed so as to carry out quantization and compression, and after the hash function is operated in a single 8×8 pixel at the above watermark embedding to extract the hash value, watermark may be embedded in the pertinent 8×8 DCT coefficients. However, with regard to such case, a problem arises wherein the watermark embedding space is very small, and in order to reduce time for operation, the present invention establishes 16×16 pixels (that is, 4 DCT blocks) as a single watermarking unit so as to embed and extract watermark.

Figure 19B:
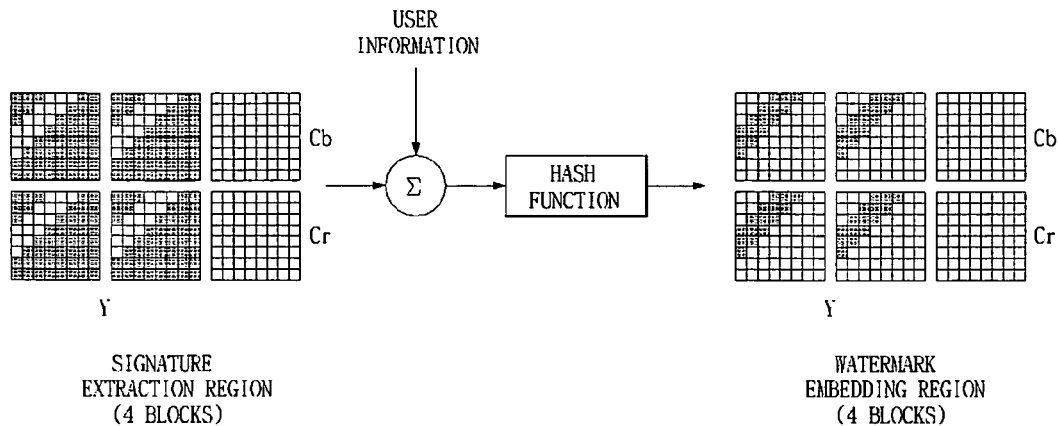
FIG. 19b is a drawing schematically showing the process for embedding watermark during a JPEG compression process.

Referring to FIG. 19b, an embodiment is shown wherein Y showing brightness is comprised of 4 DCT blocks (8×8 pixels), and each of Cb, Cr which are information showing color is comprised of one DCT block, respectively. Such embodiment is a kind of a digital image format which is presented in the format of 4:2:0.

From such embodiment, the hash value which is the watermark information is calculated and embedded as watermark, and watermark is extracted from the watermark information embedded image. The below Table 2 shows values calculating PSNR in which if the values of Q (quality factor) are 50, 75 and 90, respectively, the compressed image is called the original image, and the compressed image after embedding watermark is called the noise added image. Most of the image exceeds 40 dB, and thus it can be known that the image damage according to embedding fragile watermark is scarcely noticeable by the eye.

TABLE 2

|  | Q = 50 | Q = 75 | Q = 90 |
|---|---|---|---|
| Lenna | 40.28 | 48.95 | 59.71 |
| Koala | 41.05 | 49.51 | 59.62 |
| Sky2 | 52.41 | 54.50 | 58.81 |
| Internet1 | 38.54 | 49.12 | 59.39 |
| Internet9 | 38.68 | 49.17 | 59.61 |
| Internet10 | 43.40 | 51.25 | 60.23 |

(2) Fragile Watermarking Method in the Wavelet Transformation Domain

The method for embedding fragile watermark in the discrete cosine transformation region simultaneously with compression process are described above, and hereinbelow, according to present invention the method for embedding fragile watermark in the wavelet transformation region simultaneously with compression process are described.

Figure 20:
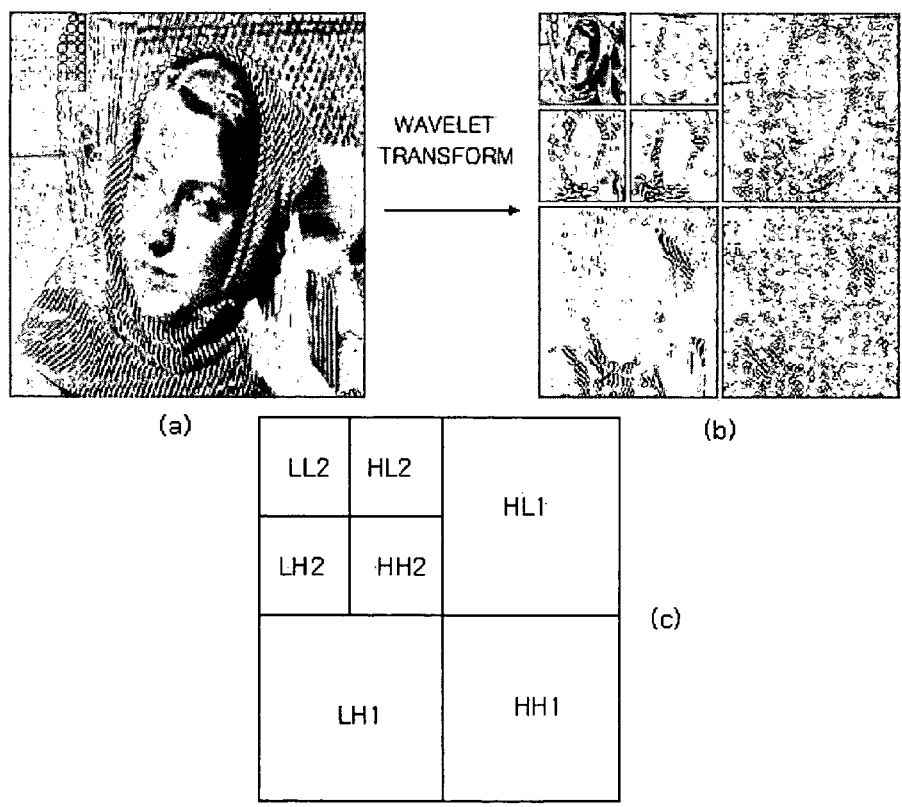
FIG. 20 is a drawing illustrating an example of the image and coefficients of the transformation plane when the image is transformed using wavelet transform.

FIG. 20 is a drawing illustrating the example of image and coefficients of the transformation plane when transforming image by using the wavelet transform. The present embodiment performs the two steps of the wavelet transform. FIG. 20(a) shows the original image, FIG. 20(b) shows the coefficient values of the wavelet transformation plane, and FIG. 20(c) shows the process of band division of the wavelet transform.

Referring to FIG. 20(c), the lower right HH1 indicates the most high frequency elements, and HL1, LH1 are bands showing the high frequency element in the direction of a column and in the direction of a row, respectively. LL2, HL2, LH2, and HH2 are bands which 2 level wavelet transformed the bands pertinent to LL1 again.

Referring to FIG. 20(b), LL2 among the above indicates the most low frequency element, and the wavelet transform has much more signal elements focused in the low frequency region than the discrete cosine transform. Accordingly, even if having only such low frequency region and recovering the image through the wavelet transform again, it is possible to obtain image close to the original image. By using such characteristic, the wavelet transform can be used in compression.

Boxes illustrated at the upper left corner of FIG. 20(a) and FIG. 20(b) illustrate the distribution of the wavelet coefficients corresponding to the original image at the time of the wavelet transform. When wavelet transforming the image region of 8×8 pixels of FIG. 20(a), the wavelet coefficients affecting the pertinent pixels in the wavelet transformation plane are illustrated in FIG. 20(b). By using such characteristic of coefficients, fragile watermark is embedded into coefficients of the wavelet transformation plane.

Figure 21A:
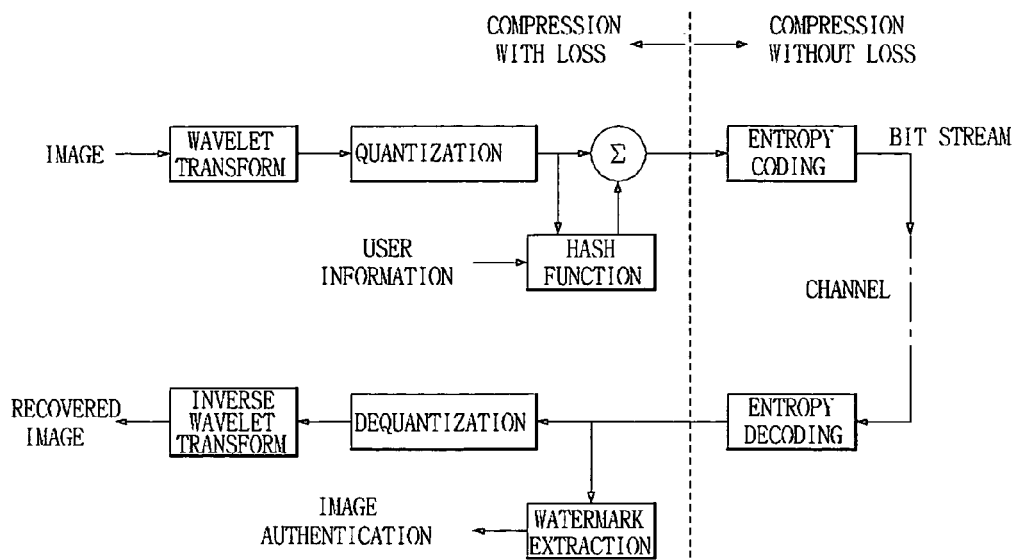
FIG. 21a is a block diagram showing the process for embedding fragile watermark simultaneously with compression during the wavelet compression process.
Figure 21B:
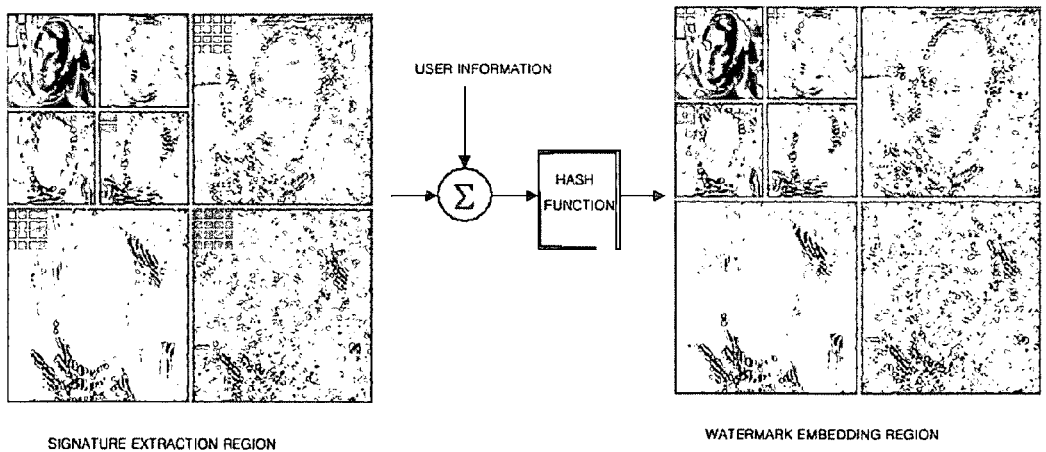
FIG. 21b is a drawing schematically showing the process for embedding fragile watermark at the wavelet transformation domain.

The process of embedding watermark by using the wavelet coefficients quantized during the process of performing the wavelet compression is described referring to FIG. 21a and FIG. 21b. FIG. 21a is a block diagram showing the fragile watermark embedding process simultaneously with the compression during the wavelet compression process. That is, the drawing is related to embedding fragile watermark simultaneously with compression at compression and watermark embedding part of the above FIG. 3a and FIG. 3b.

Referring to FIG. 21a, first, image is inputted, and if the whole frames of the image are inputted, the wavelet transform is carried out. If using the wavelet transform, an effect can be obtained wherein energy of the image signals is compressed into the wavelet coefficients of the low frequency. In this regard, quantization is performed in order to cut off the unnecessary portions. Through the quantization process, the wavelet coefficients of the high frequency region affecting the image recognition less are made into zero. That is, compression with loss is carried out.

The fragile watermark embedding of the present invention is carried out by using the quantized wavelet coefficients. The quantized coefficients are divided into the signature extraction region and the watermark embedding region, and in this regard, the unit for such division can be temporary. Generally, bigger the region, less frequent is the operated hash function, and thus the watermarking speed gets faster. Smaller the region, more frequent the operated hash function, and thus the load according to the watermarking is increased.

FIG. 21b is a drawing schematically describing the fragile watermark embedding process in the wavelet transformation region, and provides an example of a case in which the watermark embedding/extracting unit is 8×8.

As wavelet coefficients of the signature extraction region used in the input values for the hash function, total of 52 numbers of the wavelet coefficients of HH1 (16 coefficients), LH1 (16 coefficients), HL1 (16 coefficients) and HH2 (4 coefficients) are taken. Data combining the user information such as manufacturing company's unique number, product's unique number, etc. with the above wavelet coefficients of the signature extraction region are inputted to hash function. The hash values outputted therefrom become the unique hash values. It is very rare to have output values identical to the temporary input values in view of the characteristics of the hash function.

Accordingly, the hash values obtained as above are embedded as fragile watermark into the total of 12 wavelet coefficients of LL2 (4 coefficients), HL2 (4 coefficients), and LH2 (4 coefficients) which are watermark embedding region. The watermark embedding method makes the LSB of the above 12 wavelet coefficients into zero, and instead, the hash value bit obtained from the above is embedded.

In case the hash value uses MD5 which outputs 128 bits, bits among the 128 bits can randomly selected and embedded. The present embodiment selected 12 bites from the front of the 16 bites (128 bits) and had the most significant bit (MSB) of each bite as the watermark embedding information.

Figure 22:
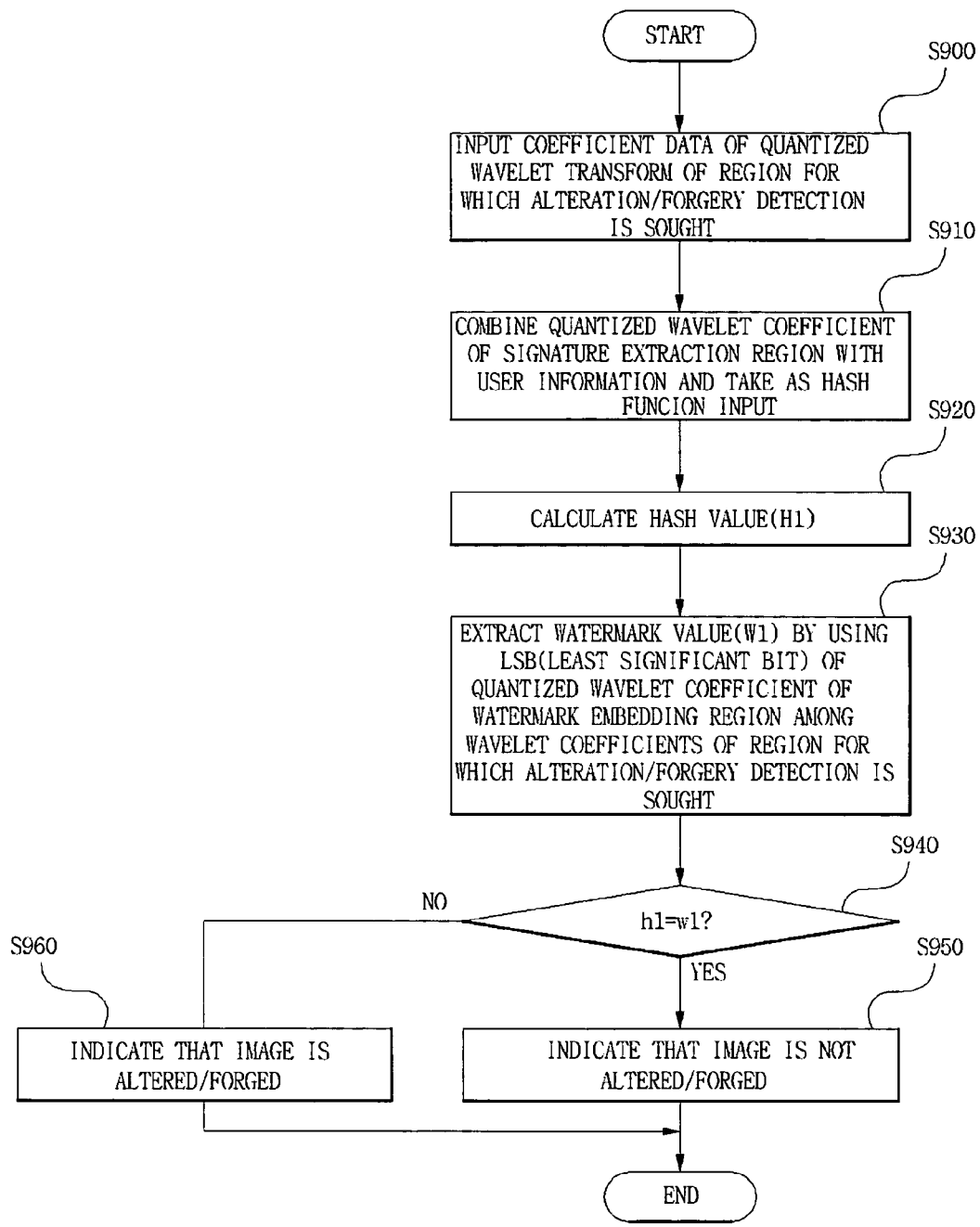
FIG. 22 is a flow chart showing the process for detecting watermark from an image embedded with fragile watermark at the wavelet transformation domain.

FIG. 22 is a flow chart showing the watermark detecting process from the fragile watermark embedded image in the wavelet transformation region.

Referring to FIG. 22, first, data of the quantized wavelet coefficients of the region for which alteration/forgery detection is sought are input (S900). Next, the quantized wavelet coefficients of the signature extraction region established at the time of embedding watermark are combined with the user information so as to be taken as input of the hash value (S910). In this regard, the hash function is identical to the hash function used at the time of embedding watermark mentioned-above, and the hash value (h1) is calculated (S920).

By using the LSB of the quantized wavelet coefficients of the watermark embedding region among the wavelet coefficients of the region for which alteration/forgery detection is sought, watermark value (w1) is extracted (S930). Whether the above hash value (h1) is identical to the watermark value (w1) is determined (S940). If two values are identical, it is determined as an image which was not altered/forged (S950), and if two values are not identical, it is determined as image which was altered/forged (S960).

With regard to the above-explained fragile watermark embedding method, a coefficient is selected which is not zero and embedded with regard to the coefficient for embedding watermark. Also, at the extraction of the watermark, in order to only use the coefficient embedded with watermark and to extract watermark, the value of the coefficient is made not to become zero after the embedding of watermark. That is, the value of the coefficient to be embedded with watermark is (00000001)b, and in case that the value of the watermark to be embedded is zero, instead of making the coefficient (00000001)b to be zero, it is made to be (00000010)b instead.

The present invention especially illustrated and described in reference to the above embodiments. However, such embodiments are used for merely examples, and a person skilled in the art pertinent to the present invention should understand that various modification can be made without deviating from the technical idea and scope of the present invention such as defined in the accompanied claims.

[Effect of Invention]

According to the present invention mentioned-above, an effect for providing a system enabling authentication of images shot and stored in real time and prevention of alteration/forgery is obtainable.

Also, effects are provided wherein robust watermark and/or fragile watermark can be embedded simultaneously with the process of performing compression, and the amount of information embedded as watermark can be increased, and further the watermark embedding speed can be increased close to the real time.

Moreover, an effect is provided wherein the interoperability of embedding and detecting watermark at the spatial domain and the transformation domain is possible.

What is claimed:

1. A method for embedding watermark into an image and detecting the watermark, comprising:

generating a pseudo random sequence, the length of the pseudo random sequence is $2^n$;

generating a watermark sequence by circular-shifting in a shift register said pseudo random sequence by the distance d;

multiplying said watermark sequence by coefficient representing watermark embedding strength; and generating a watermark-embedded image in a frequency transformation domain by adding the multiplied watermark sequence to a wavelet-transformed original image;

generating a watermark-embedded image in a spatial domain by inverse wavelet-transforming said watermark-embedded image generated in the frequency transformation domain;

cross-correlating said watermark-embedded image generated in the spatial domain and said pseudo random sequence by circular-shifting in the shift register said pseudo random sequence;

detecting a distance d', wherein the distance d' is a maximum cross-correlation value; and dividing the distance d' by $2^m$ to retrieve a quotient, wherein the quotient is embedded information.

2. A method for embedding watermark into an image, comprising:

generating a pseudo random sequence, the length of the pseudo random sequence is $2^n$;

generating a watermark sequence by circular-shifting in a shift register said pseudo random sequence by the distance d;

inverse wavelet-transforming said watermark sequence;

multiplying said inverse wavelet-transformed watermark sequence by a coefficient representing watermark embedding strength;

generating a watermark-embedded image by adding said multiplied watermark sequence to an original image in a spatial domain; cross-correlating said watermark-embedded image and said pseudo random sequence by circular-shifting in the shift register said pseudo random sequence;

detecting a distance d', wherein the distance d' is a maximum cross-correlation value; and dividing the distance d' by $2^m$ to retrieve a quotient, wherein the quotient is embedded information.

3. A digital video recorder for embedding watermark into an image which is shot in real time, and recording the image, wherein embedding watermark into the image comprises:

generating, by a processor, a pseudo random sequence, the length of the pseudo random sequence is $2^n$;

generating, by the processor, a watermark sequence by circular-shifting said pseudo random sequence by the distance d;

multiplying, by the processor, said watermark sequence by a coefficient representing watermark embedding strength;

generating, by the processor, a watermark-embedded image in a frequency transformation domain by adding the multiplied watermark sequence to a wavelet-transformed original image; and generating, by the processor, a watermark-embedded image in a spatial domain by inverse wavelet-transforming said watermark-embedded image generated in the frequency transformation domain.

* * * * *